(12) United States Patent
Ricketts

(10) Patent No.: US 9,846,846 B2
(45) Date of Patent: Dec. 19, 2017

(54) METHOD AND SYSTEM FOR ANALYZING CONTACT STUDIES

(75) Inventor: John A. Ricketts, Clarendon Hills, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1464 days.

(21) Appl. No.: 11/559,519

(22) Filed: Nov. 14, 2006

(65) Prior Publication Data

US 2008/0112557 A1   May 15, 2008

(51) Int. Cl.
  *G06F 17/30* (2006.01)
  *G06Q 10/06* (2012.01)

(52) U.S. Cl.
  CPC .................................. *G06Q 10/06* (2013.01)

(58) Field of Classification Search
  CPC .... G06Q 10/0639; G06Q 10/06; G06Q 30/02; H04M 3/00; G06F 17/3025; G06F 17/3033; G06F 17/30917
  USPC ......................................... 707/608, 736, 798
  See application file for complete search history.

(56) References Cited

U.S. PATENT DOCUMENTS

| | | | |
|---|---|---|---|
| 5,473,773 A | 12/1995 | Aman et al. | |
| 5,802,142 A * | 9/1998 | Browne | H04M 15/00 373/11 |
| 5,918,017 A | 6/1999 | Attanasio et al. | |
| 6,003,083 A | 12/1999 | Davies et al. | |
| 6,044,355 A | 3/2000 | Crockett et al. | |
| 6,404,747 B1 | 6/2002 | Berry et al. | |
| 6,442,583 B1 | 8/2002 | Eilert et al. | |
| 6,728,748 B1 | 4/2004 | Mangipudi et al. | |
| 6,922,724 B1 | 7/2005 | Freeman et al. | |
| 6,970,829 B1 | 11/2005 | Leamon | |
| 7,254,626 B1 | 8/2007 | Kommula et al. | |
| 7,349,969 B2 | 3/2008 | Gourlay et al. | |
| 7,467,225 B2 | 12/2008 | Anerousis et al. | |

(Continued)

OTHER PUBLICATIONS

Mehrotra et al.—"Call Center Simulation Modeling: Methods, Challenges, and Opportunities," 2003 Winter Simulation Conference, pp. 135-143.

(Continued)

*Primary Examiner* — Scott A Waldron
*Assistant Examiner* — Fatima Mina
(74) *Attorney, Agent, or Firm* — Isaac Gooshaw; Andrew M. Calderon; Roberts Mlotkowski Safran Cole & Calderon, P.C.

(57) ABSTRACT

A method, system and computer-readable medium for analyzing contact studies for a call service center is presented. The method includes the steps of: acquiring data instances of a Collector tool from all persons monitoring contacts at a call service center during a given study period; retrieving a study design from a Planner tool to verify that acquired data instances conform to the study design; selecting data parameters for the acquired data instances, wherein the data parameters describe multiple features of the acquired data; automatically selecting an appropriate chart format that is appropriate for measurement units used by the data parameters; and creating a chart using the appropriate chart format and the data parameters. The steps in the method may all be automatically performed by an Analyzer logic.

20 Claims, 14 Drawing Sheets

(56) References Cited

U.S. PATENT DOCUMENTS

| | | | |
|---|---|---|---|
| 7,593,904 B1* | 9/2009 | Kirshenbaum et al. | 706/12 |
| 7,720,214 B2 | 5/2010 | Ricketts | |
| 8,019,636 B2 | 9/2011 | Ricketts | |
| 2001/0032120 A1* | 10/2001 | Stuart et al. | 705/11 |
| 2002/0062454 A1 | 5/2002 | Fung | |
| 2002/0143597 A1 | 10/2002 | Andre et al. | |
| 2002/0143599 A1 | 10/2002 | Nourbakhsh et al. | |
| 2002/0147632 A1 | 10/2002 | Winham et al. | |
| 2002/0175929 A1 | 11/2002 | Hunt et al. | |
| 2002/0184069 A1 | 12/2002 | Kosiba et al. | |
| 2003/0065548 A1 | 4/2003 | Schmidt | |
| 2003/0088672 A1 | 5/2003 | Togasaki | |
| 2003/0177182 A1 | 9/2003 | Clark et al. | |
| 2003/0188208 A1 | 10/2003 | Fung | |
| 2003/0196126 A1 | 10/2003 | Fung | |
| 2003/0200473 A1 | 10/2003 | Fung | |
| 2004/0122950 A1 | 6/2004 | Morgan et al. | |
| 2004/0240635 A1* | 12/2004 | Bushey et al. | 379/88.16 |
| 2004/0266533 A1* | 12/2004 | Gentles et al. | 463/42 |
| 2005/0010682 A1 | 1/2005 | Amir et al. | |
| 2005/0013428 A1* | 1/2005 | Walters, Jr. | H04M 3/2218 379/266.08 |
| 2005/0027858 A1* | 2/2005 | Sloth | H04L 12/2602 709/224 |
| 2005/0065831 A1* | 3/2005 | Keay et al. | 705/8 |
| 2006/0074700 A1 | 4/2006 | Ricketts | |
| 2006/0136479 A1* | 6/2006 | Fan et al. | 707/102 |
| 2006/0224725 A1 | 10/2006 | Bali et al. | |

OTHER PUBLICATIONS

Klungle, Robert—"Simulation of Claims Call Center: A Success and a Failure," 1999 Winter Simulation Conference, pp. 1648-1653.

Cardenas-Navia, Jaime, Non-final Office Action dated Sep. 30, 2008, U.S. Appl. No. 10/951,827.

Cardenas-Navia, Jaime, Final Office Action dated May 18, 2009, U.S. Appl. No. 10/951,827.

Cardenas-Navia, Jaime, Non-final Office Action dated Sep. 17, 2009, U.S. Appl. No. 10/951,827.

Cardenas-Navia, Jaime, Final Office Action dated Apr. 16, 2010, U.S. Appl. No. 10/951,827.

Miller, Alan, Notice of Allowance dated Mar. 23, 2011, U.S. Appl. No. 10/951,827.

Gillis, Brian, Non-final Office Action dated Dec. 21, 2009, U.S. Appl. No. 11/098,854.

Gillis, Brian, Final Office Action dated May 26, 2010, U.S. Appl. No. 11/098,854.

Gillis, Brian, Examiner's Answer dated Dec. 21, 2010, U.S. Appl. No. 11/098,854.

* cited by examiner

| AVERAGE OF PTOTAL | | CENTER | | | |
|---|---|---|---|---|---|
| CONTACTTYPE | 133 | CENTER04 | CENTER08 | CENTER09 | GRAND TOTAL |
| TYPE04 | FALSE | 518.07 | | 396.38 | 445.06 |
| | TRUE | 557.92 | 506.37 | 450.65 | 509.86 |
| TYPE04 TOTAL | | 540.21 | 506.37 | 418.09 | 477.46 |
| TYPE07 | FALSE | 572.37 | 575.70 | 581.28 | 577.93 |
| | TRUE | 640.41 | 494.43 | | 523.62 |
| TYPE07 TOTAL | | 595.05 | 510.68 | 581.28 | 555.31 |
| TYPE09 | FALSE | 534.80 | 379.40 | 471.36 | 467.46 |
| | TRUE | 436.92 | 452.10 | 507.46 | 489.47 |
| TYPE09 TOTAL | | 518.49 | 393.94 | 491.41 | 475.17 |
| GRAND TOTAL | | 542.11 | 457.22 | 475.16 | 494.54 |

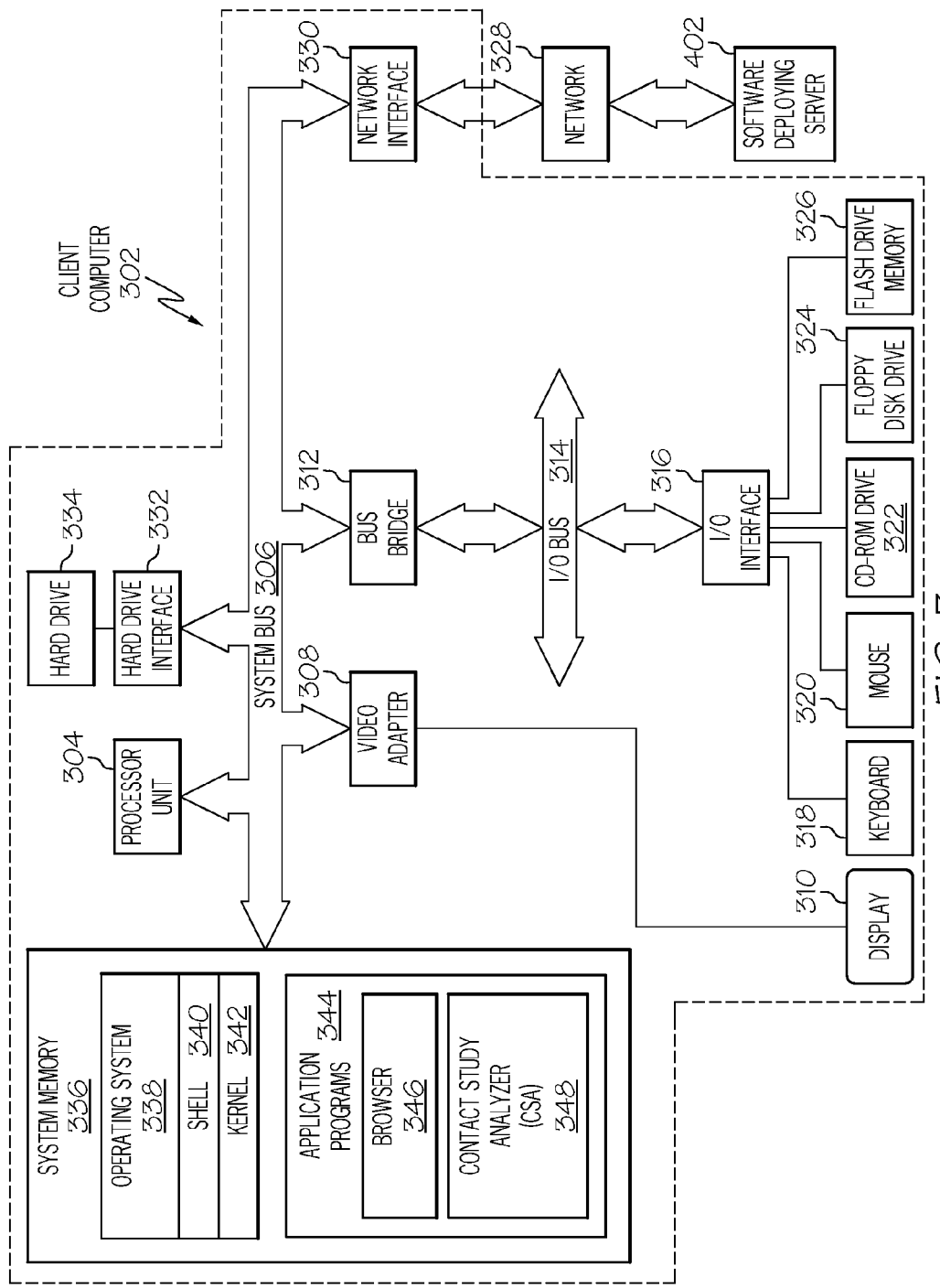

METHOD AND SYSTEM FOR ANALYZING CONTACT STUDIES

CROSS REFERENCE TO RELATED APPLICATIONS

The present application is related to the following co-pending U.S. Patent Applications: U.S. patent application Ser. No. 10/951,827 filed on Sep. 28, 2004; and U.S. patent application Ser. No. 11/062,686 filed on Feb. 22, 2005. The above-mentioned patent applications are assigned to the assignee of the present invention and are incorporated herein by reference in their entirety.

BACKGROUND OF THE INVENTION

1. Technical Field

The present invention relates in general to the field of computers, and more particularly to analyzing data results that are collected during a contact study.

2. Description of the Related Art

In an effort to improve delivery of services while maximizing profits, many enterprises outsource some of their operations, in order to benefit from the expertise and economy of scale offered by third party service providers (outsourcers). Two examples of such outsourcing are Business Process Outsourcing (BPO) and Business Transformation Outsourcing (BTO).

Under Business Process Outsourcing (BPO), an outsourcer assumes responsibility for performing one or more business processes that were previously done by the client or another outsourcer. The business processes are typically changed only slightly, if at all, but lower labor rates generally enable an overall reduction in the cost of performing the business processes, and information technology may or may not play a significant role in reducing the cost of the outsourced business processes.

In contrast, under Business Transformation Outsourcing (BTO), business processes are also assumed by an outsourcer, but the business processes themselves may be substantially changed, often through information technology and business process redesign. It is these changes in the business process and information technology that generate the need for contact studies since industry benchmarks may no longer be applicable.

As further discussion regarding the difference between a BPO and a BTO, note that a BPO can simply assume that the client's existing measures of contact handle time and customer satisfaction are sufficient if reducing handle time and improving customer satisfaction are not justifications for BPO. Conversely, BTO typically must quantify baseline activity times and project future activity times subsequent to business process and information technology transformations. Determining which activities can be reduced, eliminated, or handled via automation is critical. Likewise, BTO typically must not only quantify baseline customer satisfaction and its drivers, but also project how changes to those drivers will affect future customer satisfaction.

Since some drivers generally will be under the client's control (example: payment policies and late fees), some under the outsourcer's control (example: agent selection and training), and the remainder jointly controlled (example: customer information and billing systems), understanding the relationship between drivers and resulting satisfaction is critical to reaching an appropriate service level agreement. Neither handle time nor satisfaction changes for a particular client can be predicted accurately from industry benchmarks unless that client and that outsourcer are typical of clients and outsourcers included in those benchmarks, which is rarely if ever the case.

One type of BTO operation is a call center, in which employees of the BTO handle contacts. Contacts come in many types, including telephone calls, electronic mail, instant messages, text messages, facsimile (fax), paper mail, video conferences, web conferences, and electronic forms. Likewise, contacts come from various sources, including customers, employees, retirees, subcontractors, suppliers, regulators, investors, business partners, news media, and the general public During BTO operations, such as those performed at a call center, a survey can be performed, which categorizes and quantifies various aspects of calls made to and from the call center. However, this process requires an expert in enterprise efficiency, statistics and sampling methodology, which is expensive and lengthy. What is needed is an efficient, and preferably automated, method and system for evaluating BTO operations, including the analysis of contact studies.

SUMMARY OF THE INVENTION

To address the need stated above, the present invention provides a method, system and computer-readable medium for analyzing contact studies for a call service center. In one embodiment, the method includes the steps of: acquiring data instances of a Collector tool from all persons monitoring contacts (including telephone contacts) at a call service center during a given study period; retrieving a study design from a Planner tool to verify that acquired data instances conform to the study design; selecting data parameters for the acquired data instances, wherein the data parameters describe multiple features of the acquired data; automatically selecting an appropriate chart format that is appropriate for measurement units used by the data parameters; and creating a chart using the appropriate chart format and the data parameters. The steps in the method may all be automatically performed by an Analyzer logic.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIG. 3 depicts an exemplary client computer that can be utilized in accordance with the present invention;

DETAILED DESCRIPTION OF THE PREFERRED EMBODIMENT

Figure 1:
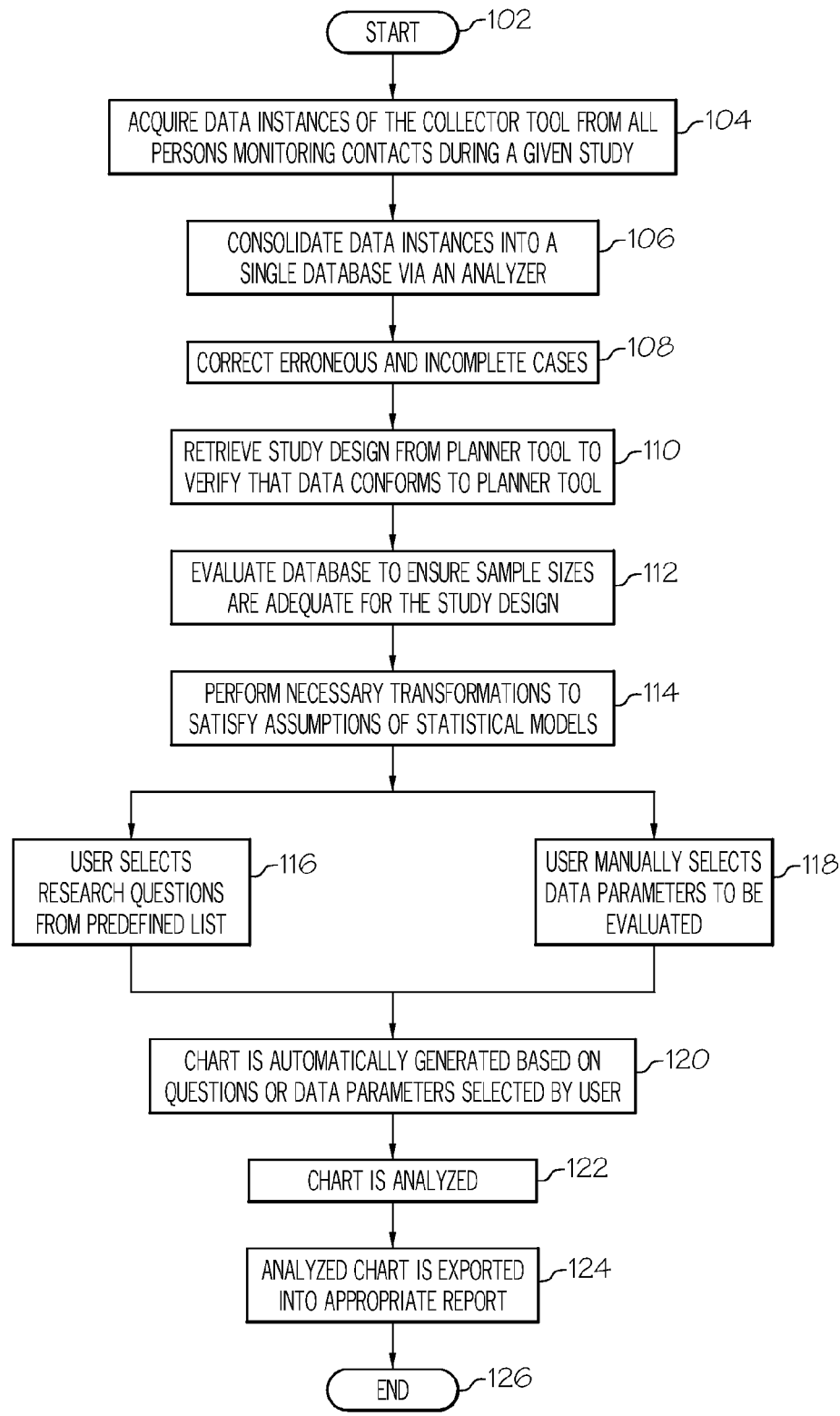
FIG. 1 is a high-level flow-chart of exemplary steps taken by an Analyzer to evaluate data collected during an examination of calls made to and from a call service center.

The present invention is a method and system for analyzing data collected during contact studies for Business Transformation Outsourcing (BTO).

Contact measurement typically consists of time spent by service agents on various activities before, during, and after each contact, but may also include work take-out opportunities associated with each activity, and can even include automated alternatives to live agents for some contacts. Contact-related data typically includes (a) classifications, such as contact type, contact subtype, contact center, customer segment, customer value, and language, (b) descriptors, such as reason for contact, time of day, day of week, source of transfer in, destination of transfer out, and automated response systems employed before or after an agent-handled call, and (c) satisfaction and its drivers.

Contact studies can be an essential part of due diligence performed before BTO agreements are reached unless the client and/or outsourcer are willing to rely on industry benchmarks or data from previous engagements. Contact studies can likewise be an essential part of transformations performed after BTO engagements are in progress. Furthermore, contact studies can be an integral part of quality assurance during steady-state services delivery after BTO transformations are complete. The presently presented method and system can be used to analyze contacts during industry benchmark studies across multiple enterprises.

Directly related to the present invention are "Method and System for Planning and Managing Call Center Studies for Business Transformation Outsourcing" (U.S. patent application Ser. No. 10/951,827, filed on Sep. 28, 2004), which is herein incorporated by reference in its entirety, and which invention is hereafter referred to as a "Planner" or "Planner logic", and "Call Center Study Method and System" (U.S. patent application Ser. No. 11/062,686, filed on Feb. 22, 2005), which is herein incorporated by reference in its entirety, and which invention is hereafter referred to as "Collector" or "Collector logic." In one embodiment, the Planner is known within IBM Global Services as the "BTO Contact Study Planner," and the Collector is known within IBM Global Services as the "BTO Contact Study Collector". The present invention describes herein a tool known as the BTO Contact Study Analyzer (referred to herein as an "Analyzer" or "Analyzer logic"), and is the third tool in this suite.

As the names suggest, the Planner is used to plan and manage a contact study, the Collector is used to gather and store data, and the Analyzer is used to analyze and document the results. Although such data analysis can be performed with generic tools, such as spreadsheet, database, or statistical software packages, generic tools have two shortcomings. First, they are not attuned to the specific research questions most commonly addressed during contact studies. Second, they require their users to have a relatively high level of knowledge of data analysis methods.

By addressing these challenges, the present invention reduces the time and effort required for data analysis to a small fraction of what's required for many users of generic tools. Moreover, the present invention has some capabilities not found in generic tools.

With reference now to the figures, and in particular to FIG. 1, a high level flow chart of exemplary steps taken by the present invention is presented. After initiator block 102, a user (such as a chief researcher or a research assistant working on a survey of how calls are handled at a call-in service center), acquires instances (data) from a Collector tool (tool system used to categorize and collect observational data), as described in block 104. These instances are provided by all observers who/that are monitoring telephone call contacts to and from the call-in service center during a given study period. Note that the observers may either be persons, or they may be software-driven monitors that monitor calls according to their length (through the use of software timers) and their phase. The phase of the call is defined by a category of the call. A particular phase can be determined by the call-in service center employee keying in a phase code during the call. Alternatively, the particular phase can be determined by software that identifies keywords (through voice-recognition software) in the call. For example, if the software identifies the term "problem" in the telephone conversation, then the phase is identified as (determined to be) in the "problem" phase, which is discussed in additional detail in exemplary manner in FIG. 2a as a contactType of "contact type."

Referring again to FIG. 1, block 106 describes the step of the user consolidating the data instances received from the Collector tool into a single database. This action is performed by the user through the use of an Analyzer, which assimilates data from multiple storage locations. For example, assume that the data was collected and input into multiple laptop computers by the observers. These laptop computers are then subsequently connected to a network, which allows the Analyzer logic to access the storage devices (e.g., hard drives) in all of the laptop computers, withdraw the necessary data, and assemble it into a single database for use by the Analyzer.

Figure 2A:
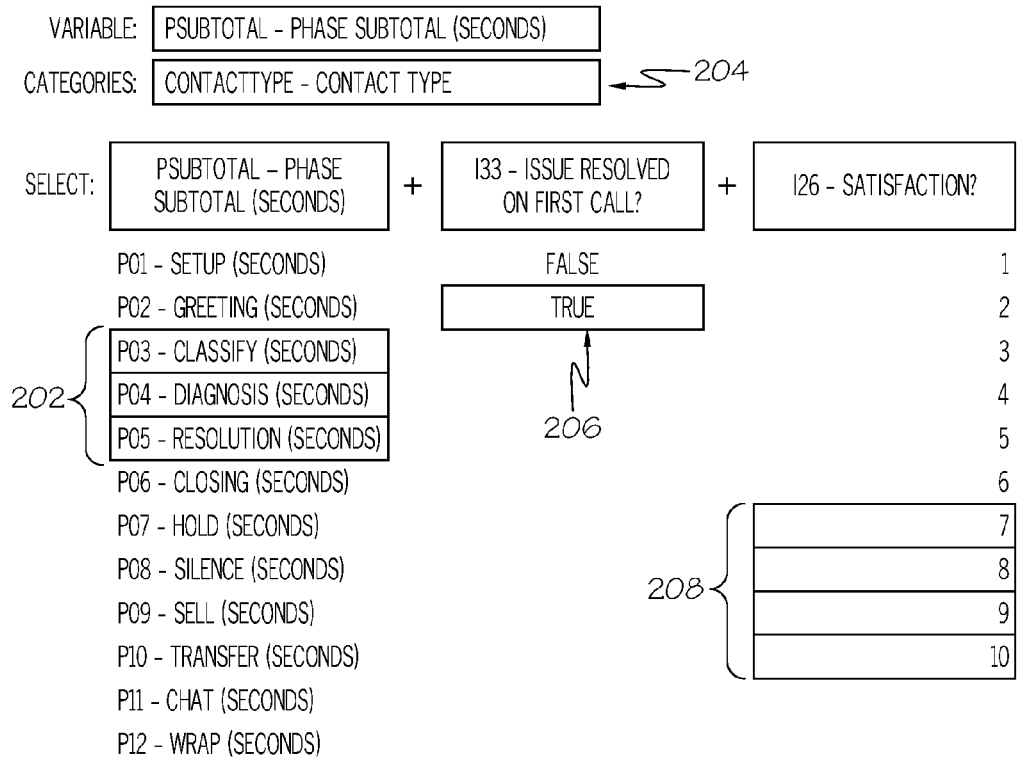
FIG. 2a depicts a graphical user interface (GUI) that permits a user to manually select evaluation criteria to be used when evaluating collected data that are related to the call service center calls.

As described in block 108, the Analyzer then corrects any erroneous and/or incomplete case data, including discarding that case data which is not needed for a particular application by the Analyzer. Logic for identifying which data is erroneous, incomplete, or not needed is provided by the Analyzer. For example, assume that a call has 12 subphases as shown in FIG. 2a. One of these subphases is "diagnosis" of a problem, which logically leads to a "resolution" subphase. However, if the data collected by the Analyzer has data related to the "resolution" subphase without a "diagnosis" subphase, then the "diagnosis" subphase is apparently missing. Similarly, if data for the contact type shown in FIG. 2a includes data for a "birthday greeting" subphase, which is not part of this contact type, then such data is erroneous and is discarded.

Similarly, if the Analyzer detects that a resource was inappropriately accessed, this too would be noted by the Analyzer. For example, assume that the contact type was for a problem resolution with a customer. During the contact, the call-in center employee called up a webpage to see how his stocks are doing that day. This personal use of the Internet is clearly inappropriate when handling a service call, and thus the Analyzer would make a note thereof, in order to 1) identify a problem with resource call tracking, or 2) if there is not a problem with the resource call tracking, notifying a supervisor of the inappropriate activity. What steps are taken in response to the employee checking his stock during company hours are defined by the call-in center's policy-driven rules, which are described more fully in FIGS. 7*a-b*.

Referring back now to FIG. 1, the Analyzer then retrieves a study design from the Planner tool (block 110). For example, assume that the Planner tool has previously created a design for how calls to a call center are to be studied. The Analyzer retrieves that design and verifies that the data received from the Collector conforms to the plan. Thus, if the design calls for time values (e.g., how long a phase took), then temperature values collected would be inappropriate, and the Analyzer would make this determination. Similarly, the Analyzer determines that sample sizes for data collected by the Collector are adequate for a particular study design created by the Planner tool (block 112). As described in block 114, the Analyzer will, if necessary (according to the steps taken in block 110 and 112), perform any necessary transformations to the collected data to satisfy assumptions of statistical models. Thus, if more data is needed, the Collector is so notified. If the data is of the wrong type, the Collector is so notified.

After step 114, the process can take one of two pathways, as shown in block 116 and 118. In block 116, the user selects research questions from a predefined list. For example, assume that the user is presented, on a Graphical User Interface, the following three optional questions:

Option 1. What is the average time for service calls in every call center?

Option 2. What is the average time that each call center puts customers on hold?

Option 3. What is the average number of calls each call center handles in a day?

By simply selection Option 1, 2, or 3, the Analyzer automatically pulls the appropriate data from the consolidated database (created in block 106) to generate the appropriate charts/reports needed to intelligently answer the optioned question.

Alternatively, the user may manually select data parameters to be evaluated (block 118). This process is demonstrated in FIG. 2*a*, and requires a higher level of sophistication in statistical analysis and business evaluation. Nonetheless, such flexibility allows the user to zero in on key issues in a way that the process shown in block 116 may not allow.

After data parameters are selected (either manually as described in block 118 or automatically as described in block 116), charts are automatically generated (block 120). The user then analyzes the chart (block 122), and if appropriate makes recommendations based on this analysis. If a report is to be generated based on the results of the data analysis, then the generated charts are exported to an appropriate report (block 124), and the process ends (terminator block 126).

The Analyzer in the present invention has capabilities illustrated below. Common across all the others is the capability for users to select individual variables, sets of related variables, and categories within variables from lists generated automatically by the system from the database. In addition to variable names, the lists include variable descriptions and units of measure, too. This allows users to remain focused on the problem rather than data types, structure, and validation rules.

Referring now to FIG. 2*a*, parameter selection starts with picking a variable or a set of related variables to plot from drop-down lists. Sets available from these drop-down lists include contact phases, information systems available to agents, and functions within those systems. Parameter selection proceeds to the choice of categories and aggregations by which variables will be analyzed. For example, in FIG. 2*a*, analysis of data supplied by the Collector is specified by highlighted elements as (1) subtotal of handle time in contact phases 03, 04, and 05 (202), (2) by all contact type categories (204), (3) but only for cases where the caller's issue was resolved during the first call (206), and (4) which resulted in a satisfaction rating of 7 or greater (208).

Although this user interface is a simple point-and-click design, the logic and computations needed to make that interface simple are themselves relatively complex. For example, the Analyzer has to know that (1) variable I33 is type Boolean and the database contains both true and false values in that column, (2) variable I26 is type Integer and the database contains values ranging from 1 to 10 in that column, (3) variable subtotal is computed dynamically as the row-wise sum of variables P03, P04, and P05, and (4) variable contact type has at least two valid values.

These tasks are made more difficult by the ability of users to customize data collection via the Collector tool with new variables. More than half the variables in a typical study are customized, and customization can range as high as 90% of the variables. The Analyzer therefore not only has to know how to select rows and columns from the database and then perform row-wise and column-wise calculations on the selected data, it also has to discover data types and valid values before presenting options to the user.

It is often the case that business process evaluations have answers that are relatively easy, but questions that are difficult. As the saying goes, knowing what to ask is often harder that getting an answer to your question. To address this problem, the present invention can generate meaningful questions, in a regressive manner, from the answers (collected data). That is, by manually selecting certain parameters (phase, whether an issue was resolved on a first call, customer satisfaction level), a new question can be created or re-defined. In the example shown in FIG. 2*a*, selecting the highlighted parameters may cause the Analyzer to create a question such as "For all customers whose issues are resolved on their first call (I33), and who have a satisfaction rating of seven or above (I16), what was the average amount of time spent classifying (P03), diagnosing (P04) and resolving (P05) the issue?" Through the use of such Analyzer-generated questions, even an unsophisticated user can create a focused business process evaluation that is tailored to available data.

Figure 2B:
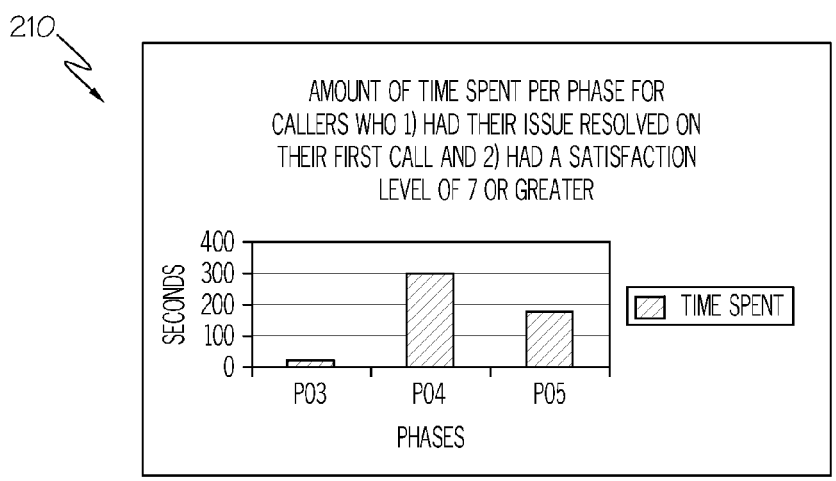
FIGS. 2b-i illustrate various charts that can be generated by the Analyzer to allow a user to study the collected data.

Similarly, by matching the type of data that is selected by the user with data parameters used by specific types of charts, charts can automatically be generated from the data that is selected by the user. For example, in the selections highlighted in FIG. 2*a*, the Analyzer would NOT chart parameter I33 ("Issue resolved on a first call?"), since there is only one value (TRUE) selected. Similarly, the Analyzer would NOT chart I26 ("Satisfactions") since the Psubtotals (P03, P04 and P05) provide more significant data related to any customer with a high satisfaction level (7 or higher). Thus, a chart 210, shown in FIG. 2*b*, is automatically generated by the Analyzer, which intuitively shows that satisfied callers (those with a satisfaction level of 7 or higher and had their issue resolved on a first call) are those who received adequate time to explain their problem (P04), which was resolved in a short amount of time (P05), without much time taken up classifying the call (P03). Not only did the Analyzer determine what data to chart, but the Analyzer also determined that a bar chart would provide the most meaningful graphical representation of the selected data.

Other types of selected data may result in the Analyzer selecting different types of charts. For example, a Pareto chart, illustrated in FIG. 2b, highlights differences between groups by sorting counts so that the most-frequently occurring categories are plotted toward the left. For example, Type07 and Type06 are defined the most-frequently occurring and least-frequently occurring contact types, respectively. Type07 may be a call to the call-in service center for help with installing a software package, while Type04 may be a call to the call-in service center asking about a service pack.

Figure 2C:
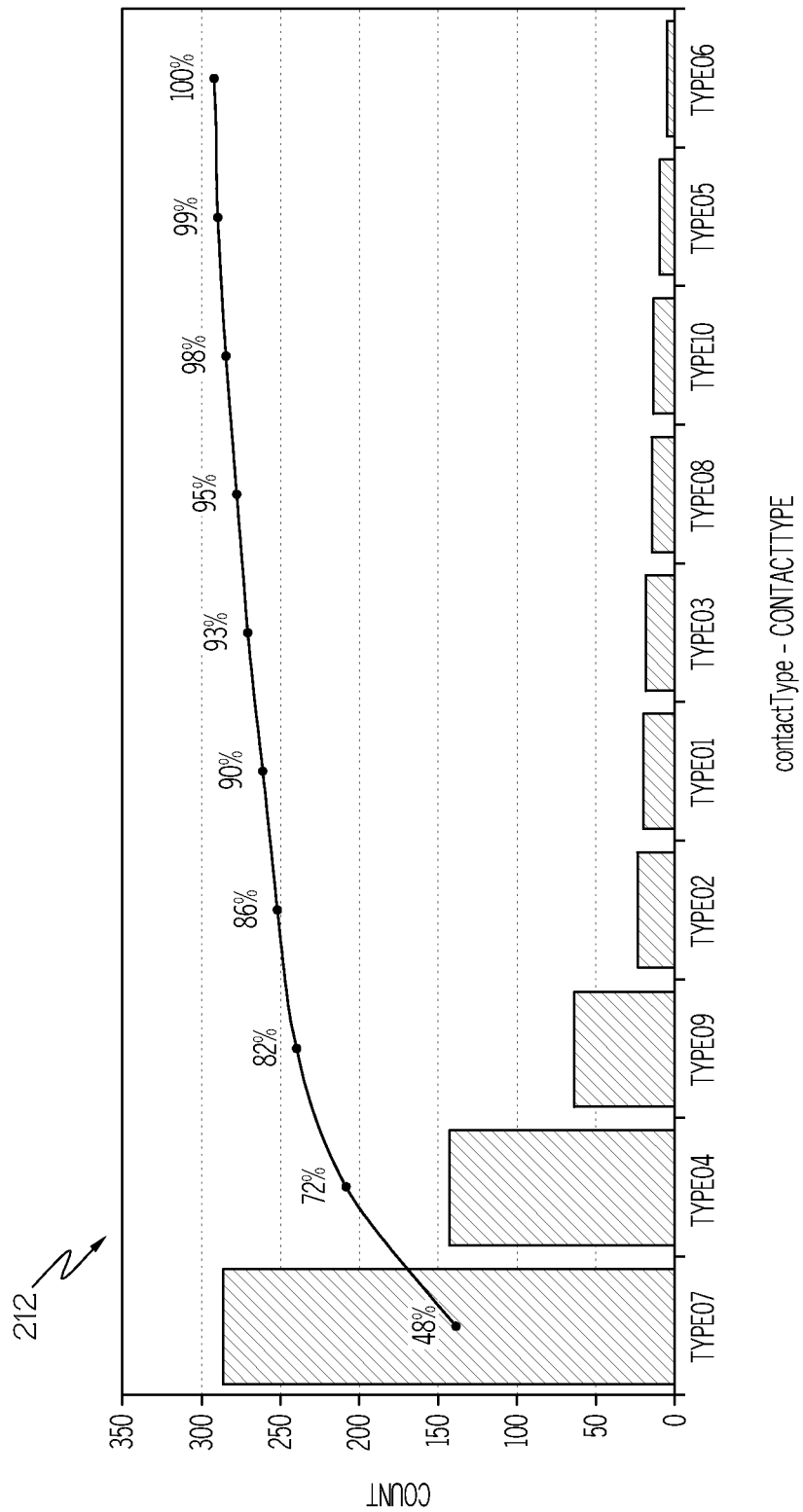

A Pareto distribution is characterized by having the majority of occurrences in a minority of the categories. Hence, the cumulative percent line is an enhancement that highlights the relative contribution of each category. A Pareto chart 212, such as shown in FIG. 2c has many uses, including being used as a diagnostic tool and decision aid. For example, if certain contact types require agents with specific skills, knowing the prevalence of contact types helps in planning capacity and training. Likewise, if the most-frequently occurring contact types are more amenable to automated self-service, the leverage from automation can be greater.

Note that chart 212 is automatically scaled by the Analyzer to force the contact type of call with the highest count (Type07) into the leftmost position, with other contact types progressively declining to the right.

Figure 2D:
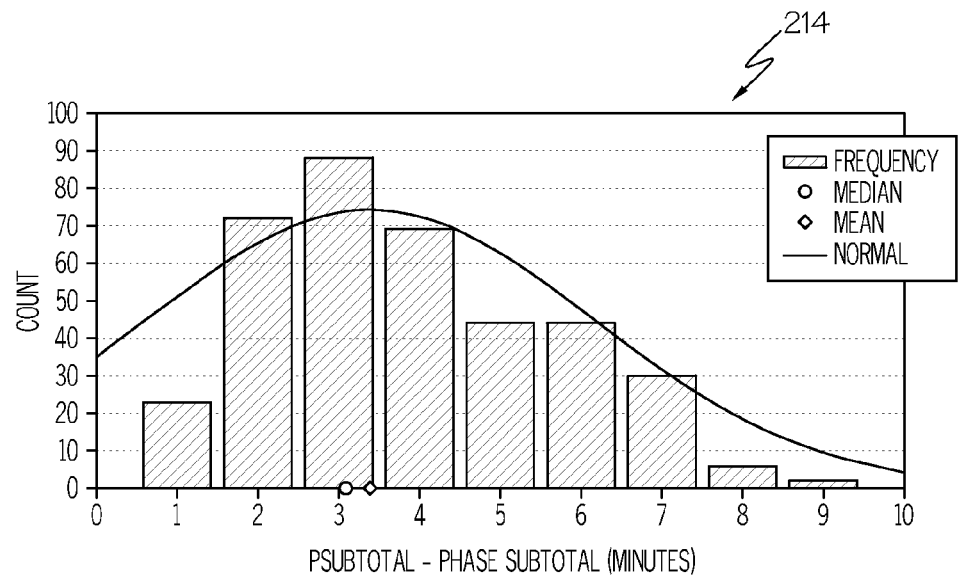

A histogram, shown in exemplary fashion in FIG. 2b and again as chart 214 in FIG. 2d, shows the distribution of a variable. Enhancements provided by the Analyzer include:
  rescaling automatically to sensible intervals, such as from seconds to minutes
  plotting statistics, such as the mean and median, for variables measured on continuous scales so that outliers and their impact on skew can be visualized
  overlaying reference distributions, such as the normal distribution, so departures from the reference can be visualized Other enhancements not illustrated in FIGS. 2b and d include:
  scrolling charts too wide to display at the selected resolution, such as when the horizontal axis covers all days during a year
  aggregating counts of items/events associated with recurring time periods, such as hours of the day, days of the week, working days of the month, etc. For example, counts by hour of the day aggregate across multiple days into 24 hourly buckets, counts by day of the week aggregate across multiple weeks into 7 weekday buckets, and counts by working day of the month aggregate across multiple months into 23 workday buckets.

In FIG. 2d, the distribution of handle times for selected contact phases can be seen to have slight positive skew (i.e., the mean is pulled to the right by a handful of cases where contact handle time is 8 minutes or longer). And as more contact phases are added into the subtotal, the skew becomes even more pronounced. This finding matters because benchmarks and performance targets for contact centers are often expressed in terms of average handle times even though the mean deviates from the median.

Note that chart 214 shows the mean being pulled to the right of the median, thus indicating that one or more subphases (5-9) are inordinately long. Thus, the Analyzer permits a user to evaluate and correct one or more "out-of-bounds" call handlers or phase types to cause the mean and median to move closer together.

Figure 2E:
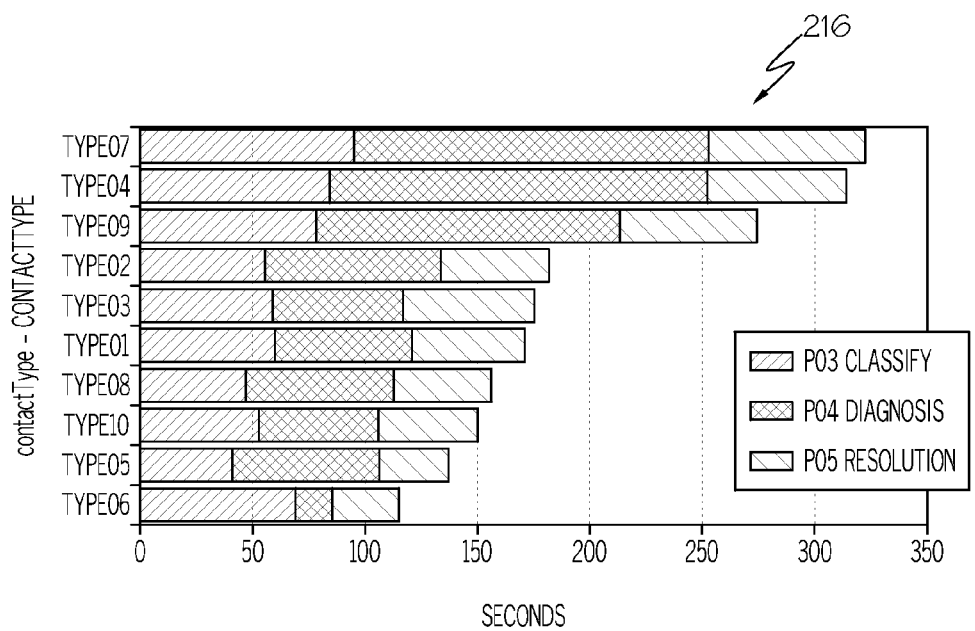

A stacked bar chart 216, illustrated in FIG. 2e, shows the aggregation of variables by category. In the figure, the stacks represent average handle time (AHT) per contact phase. Enhancements provided by the Analyzer include:
  limiting the aggregation to specific categories of interest, such as just a handful of many contact phases
  sorting the stacks by overall size to rank categories visually (e.g., contact types 07, 04, and 09 have markedly longer AHT)
  sorting within the stacks to place categories with biggest share at the base of the stacks (i.e., the Diagnosis phase has longer AHT than the Classify phase, which has longer AHT than the Resolution phase)

Other enhancements not illustrated in FIG. 2e include:
  100% option to show proportions rather than aggregations (i.e., this tells the user whether categories with longer AHT overall also have a different breakdown by phase)
  other descriptive statistics (e.g., median, maximum, minimum, or inter-quartile range (defined as the difference between the $75^{th}$ and $25^{th}$ percentile)) can be chosen for the bars instead of the mean In FIG. 2e, these enhancements make it immediately clear that three contact types have substantially longer handle times—and nearly half those times are devoted to diagnosing the caller's problem. Furthermore, since those three contact types are also the most prevalent (compare FIG. 2d,) the leverage from improving their performance would be high.

Figure 2F:
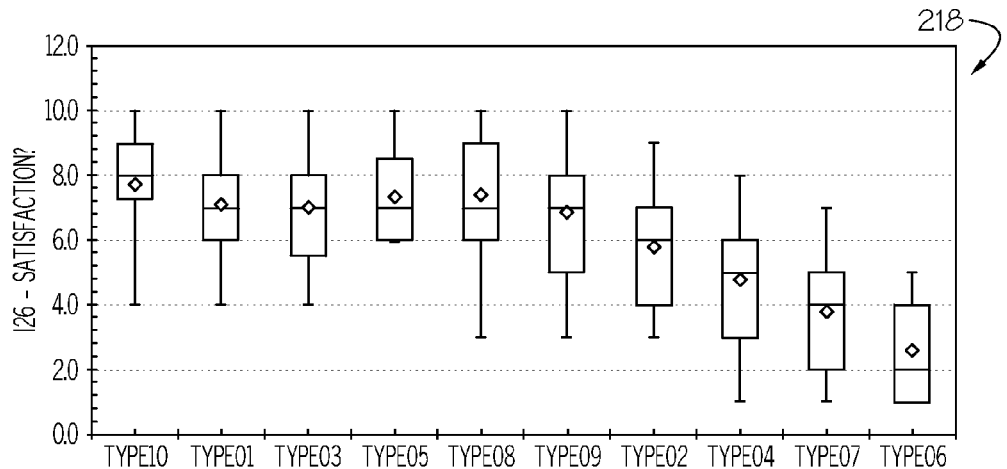

Each element in a box & whiskers chart 218, illustrated in FIG. 2f, displays five or six statistics visually. The $75^{th}$, $50^{th}$, $25^{th}$ percentiles are often shown via boxes. The whiskers may show maximum and minimum, some multiple of the inter-quartile range (e.g., 1.5*IQR), or other statistics, such as standard deviation or standard error of the mean.

Box & whisker charts often take one of these forms: (1) distribution of one variable by categories of another variable, (2) distribution of one variable over time, or (3) distributions of multiple variables measured on a common scale.

In the box & whiskers chart 218, satisfaction is measured on a scale from 1 (low) to 10 (high) against contact types. Enhancements in the present invention include:
  Form #1—sorting the categories by descriptive statistics, including maximum, minimum, mean, median, inter-quartile range, or skew Other enhancements not illustrated in FIG. 2f include:
  Form #2—plotting by time periods in order to see whether the patterns by categories are stationary
  Form #3—plotting sets of related variables (columns in the database), such as usage time for systems or functions, rather than categories of a single variable (rows in the database)
  scrolling charts too wide to display at the selected resolution, such as when the horizontal axis covers all days during a year In FIG. 2f, sorting makes it easy to see in chart 218 that mean satisfaction is substantially lower for contact types 06, 07, 04, and 02. This finding is not as easy to extract from an unsorted chart, and generic tools do not provide such automatic sorting capability.

Figure 2G:
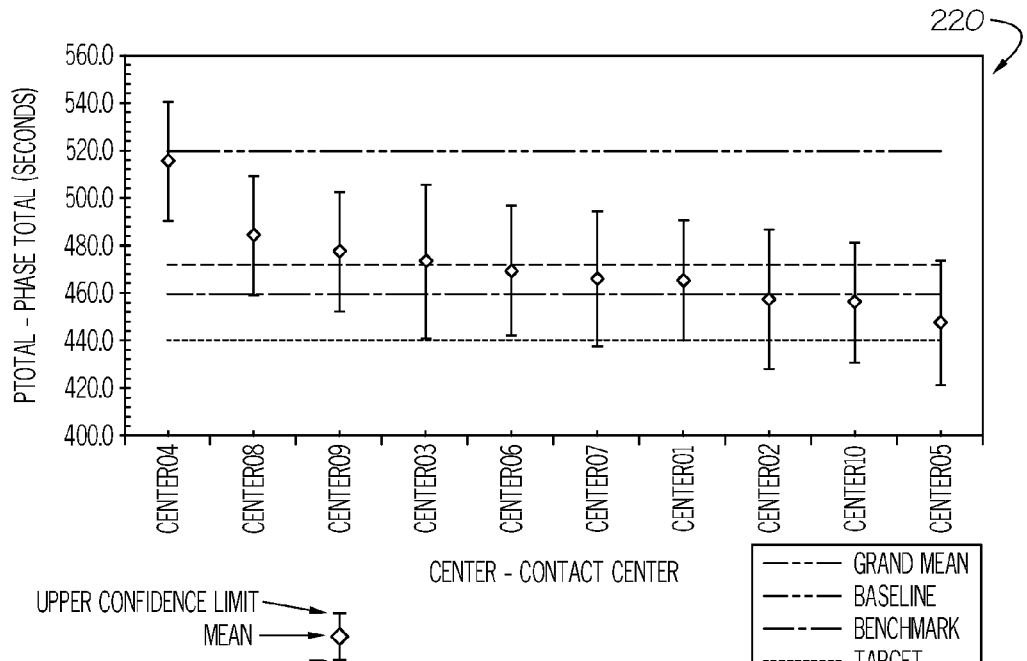

A means & confidence intervals chart 220, illustrated in FIG. 2g, plots statistics across categories (cross-sectional analysis) and/or time periods (longitudinal analysis). In the figure above, for instance, 90% confidence intervals for contact handle time are plotted across various contact centers, and those categories are optionally sorted by size rather than name in order to highlight differences with the nearest neighbors. In contrast to a simple unordered plot of means, this figure reveals that no differences between neighboring contact centers are statistically significant at the 10 level, but the difference between the extreme contact centers (04 vs. 05) is significant.

An enhancement in the present invention (and in particular the Analyzer) is to plot the following various reference lines.

The baseline shows that most centers (except 04) have successfully reduced their average handle time (AHT) since the baseline was established. Likewise, some centers (05, 10, 02) have reduced AHT below the benchmark. The grand mean shows that on overall AHT, however, the enterprise has not yet reached the benchmark. Nevertheless, three centers have passed the benchmark, and one is approaching the target, which is a stretch goal beyond the benchmark. All reference lines are illustrated in FIG. 2g even though they tend to be activated just one or two at a time to keep the chart from becoming cluttered.

Figures 2H, 2I:
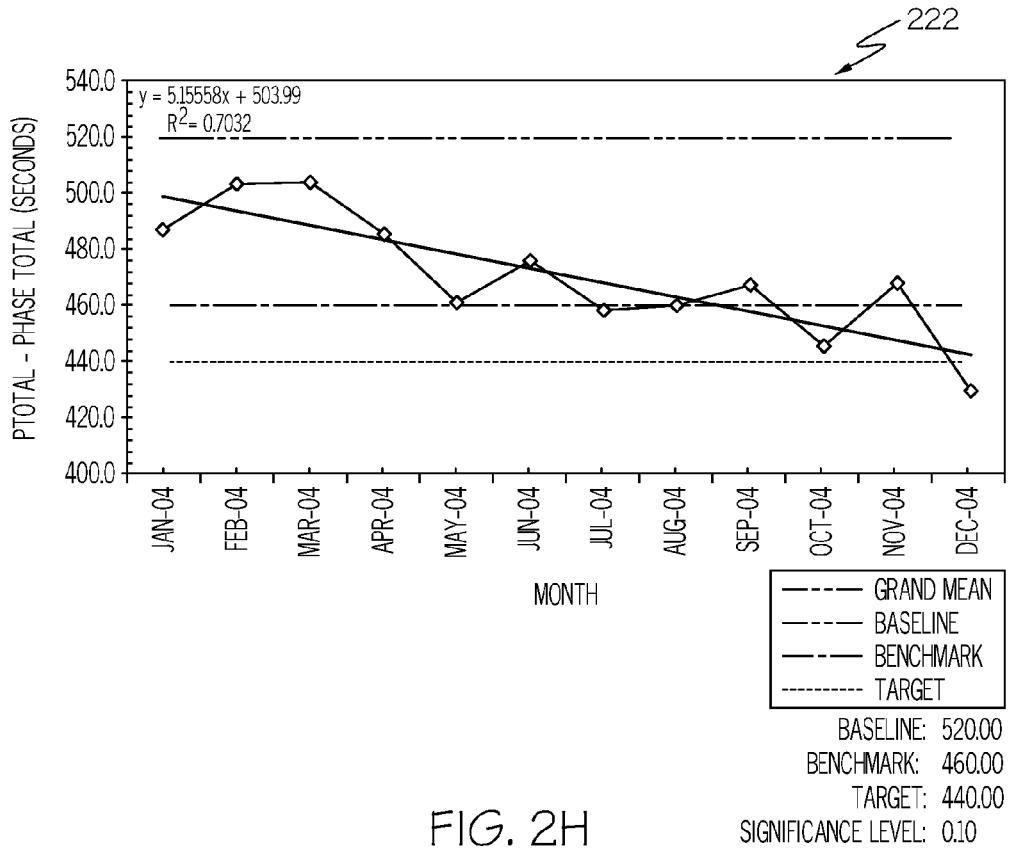

The time series chart 222 illustrated in FIG. 2h is the longitudinal mate to the previous cross-sectional chart. In this figure, means are plotted for contact handle time over time periods. The resolution on those time periods is adjustable over a wide spectrum, including year, quarter, month, week, day and hour. Analysis often begins at wide resolution (e.g., quarterly), then proceeds to narrower resolution for periods of interest (e.g., daily).

An enhancement in the present invention is to plot the trend line for the in-scope periods. In FIG. 2h, for instance, the trend is favorable (i.e., average handle time (AHT) is being reduced over time), and the regression is significant. An enhancement shown in FIG. 2h is to turn confidence intervals off to reduce clutter. Another enhancement not shown in FIG. 2h is to restore previous reference values for each variable or set whenever they are re-selected.

FIG. 2i illustrates a crosstabulation chart 224 of average handle time (AHT) for the three most-prevalent contact types and three lowest-performing contact centers broken down further by I33, which is a custom variable measuring first call resolution (FCR). Multi-way crosstabulations such as this are automatically generated by predefined queries. Such queries facilitate recurring activities, such as quality assurance, as well as regular management reporting.

With reference now to FIG. 3, there is depicted a block diagram of an exemplary client computer 302, in which the present invention may be utilized. Client computer 302 includes a processor unit 304 that is coupled to a system bus 306. A video adapter 308, which drives/supports a display 310, is also coupled to system bus 306. System bus 306 is coupled via a bus bridge 312 to an Input/Output (I/O) bus 314. An I/O interface 316 is coupled to I/O bus 314. I/O interface 316 affords communication with various I/O devices, including a keyboard 318, a mouse 320, a Compact Disk-Read Only Memory (CD-ROM) drive 322, a floppy disk drive 324, and a flash drive memory 326. The format of the ports connected to I/O interface 316 may be any known to those skilled in the art of computer architecture, including but not limited to Universal Serial Bus (USB) ports.

Client computer 302 is able to communicate with a software deploying server 402 via a network 328 using a network interface 330, which is coupled to system bus 306. Network 328 may be an external network such as the Internet, or an internal network such as an Ethernet or a Virtual Private Network (VPN).

A hard drive interface 332 is also coupled to system bus 306. Hard drive interface 332 interfaces with a hard drive 334. In a preferred embodiment, hard drive 334 populates a system memory 336, which is also coupled to system bus 306. System memory is defined as a lowest level of volatile memory in client computer 302. This volatile memory includes additional higher levels of volatile memory (not shown), including, but not limited to, cache memory, registers and buffers. Data that populates system memory 336 includes client computer 302's operating system (OS) 338 and application programs 344.

OS 338 includes a shell 340, for providing transparent user access to resources such as application programs 344. Generally, shell 340 is a program that provides an interpreter and an interface between the user and the operating system. More specifically, shell 340 executes commands that are entered into a command line user interface or from a file. Thus, shell 340 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 342) for processing. Note that while shell 340 is a text-based, line-oriented user interface, the present invention will equally well support other user interface modes, such as graphical, voice, gestural, etc.

As depicted, OS 338 also includes kernel 342, which includes lower levels of functionality for OS 338, including providing essential services required by other parts of OS 338 and application programs 344, including memory management, process and task management, disk management, and mouse and keyboard management.

Application programs 344 include a browser 346. Browser 346 includes program modules and instructions enabling a World Wide Web (WWW) client (i.e., client computer 302) to send and receive network messages to the Internet using HyperText Transfer Protocol (HTTP) messaging, thus enabling communication with software deploying server 402.

Application programs 344 in client computer 302's system memory also include a Contact Study Analyzer (CSA) 348. CSA 348 includes code for implementing the processes described in FIGS. 1-2i. In one embodiment, client computer 302 is able to download CSA 348 from software deploying server 402.

The hardware elements depicted in client computer 302 are not intended to be exhaustive, but rather are representative to highlight essential components required by the present invention. For instance, client computer 302 may include alternate memory storage devices such as magnetic cassettes, Digital Versatile Disks (DVDs), Bernoulli cartridges, and the like. These and other variations are intended to be within the spirit and scope of the present invention.

Figure 4:
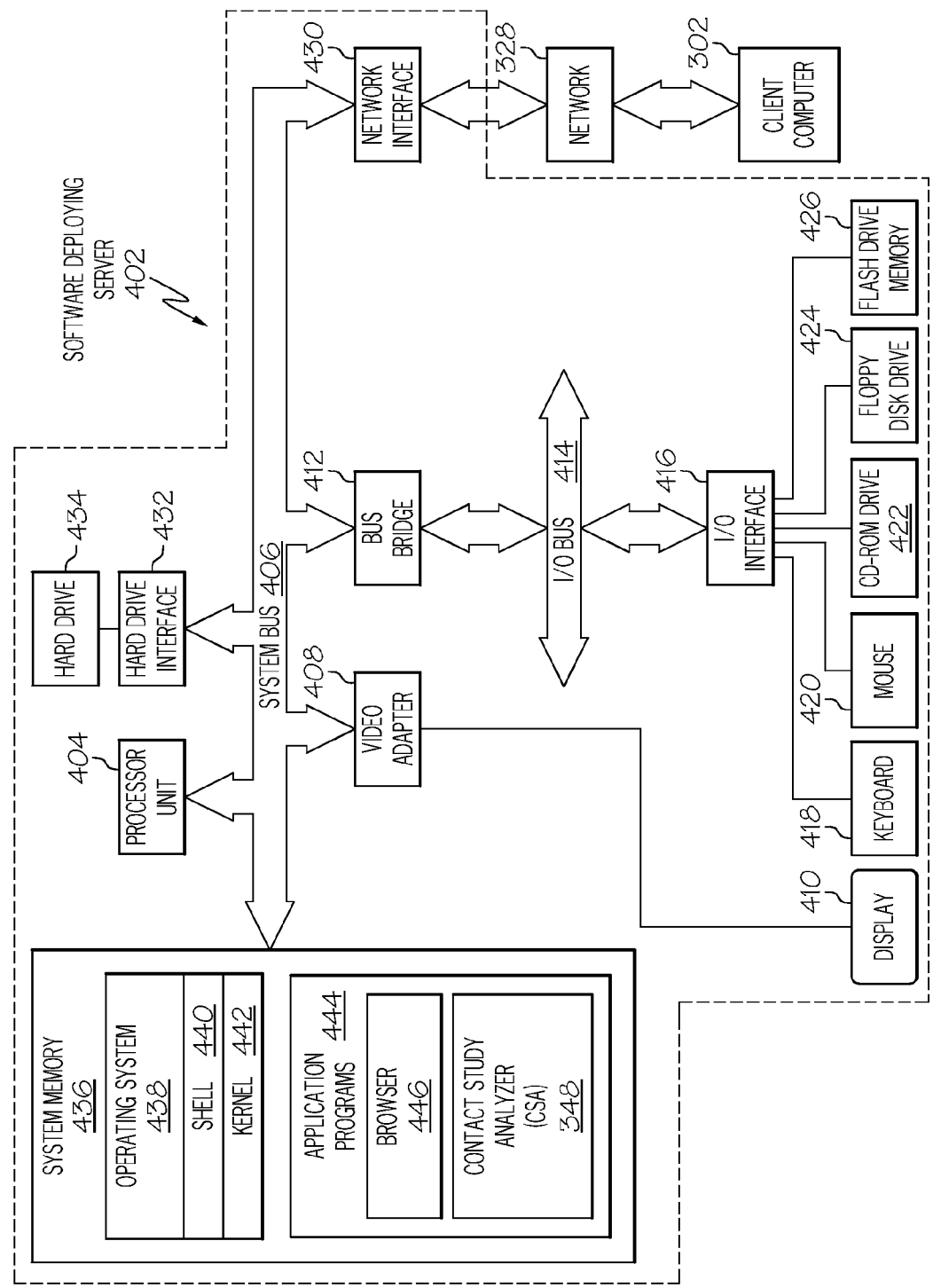
FIG. 4 illustrates a software deploying server that is capable of deploying software to the client computer shown in FIG. 3 to implement the present invention.

As noted above, CSA 348 can be downloaded to client computer 302 from software deploying server 402, shown in exemplary form in FIG. 4. Software deploying server 402 includes a processor unit 404 that is coupled to a system bus 406. A video adapter 408 is also coupled to system bus 406. Video adapter 408 drives/supports a display 410. System bus 406 is coupled via a bus bridge 412 to an Input/Output (I/O) bus 414. An I/O interface 416 is coupled to I/O bus 414. I/O interface 416 affords communication with various I/O devices, including a keyboard 418, a mouse 420, a Compact Disk-Read Only Memory (CD-ROM) drive 422, a floppy disk drive 424, and a flash drive memory 426. The format of the ports connected to I/O interface 416 may be any known to those skilled in the art of computer architecture, including but not limited to Universal Serial Bus (USB) ports.

Software deploying server 402 is able to communicate with client computer 302 via network 328 using a network interface 430, which is coupled to system bus 406. Access to network 328 allows software deploying server 402 to deploy CSA 348 to client computer 302.

System bus 406 is also coupled to a hard drive interface 432, which interfaces with a hard drive 434. In a preferred embodiment, hard drive 434 populates a system memory 436, which is also coupled to system bus 406. Data that populates system memory 436 includes software deploying server 402's operating system 438, which includes a shell 440 and a kernel 442. Shell 440 is incorporated in a higher level operating system layer and utilized for providing transparent user access to resources such as application programs 444, which include a browser 446, and a copy of CSA 348 described above, which can be deployed to client computer 302.

The hardware elements depicted in software deploying server 402 are not intended to be exhaustive, but rather are representative to highlight essential components required by the present invention. For instance, software deploying server 402 may include alternate memory storage devices such as flash drives, magnetic cassettes, Digital Versatile Disks (DVDs), Bernoulli cartridges, and the like. These and other variations are intended to be within the spirit and scope of the present invention.

Note further that, in a preferred embodiment of the present invention, software deploying server 402 performs all of the functions associated with the present invention (including execution of CSA 348), thus freeing client computer 302 from having to use its own internal computing resources to execute CSA 348.

It should be understood that at least some aspects of the present invention may alternatively be implemented in a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

As described above, in one embodiment, the processes described by the present invention, including the functions of CSA 348, are performed by service provider server 402. Alternatively, CSA 348 and the method described herein, and in particular as shown and described in FIGS. 1-2i, can be deployed as a process software from service provider server 402 to client computer 302. Still more particularly, process software for the method so described may be deployed to service provider server 402 by another service provider server (not shown).

Figure 5A:
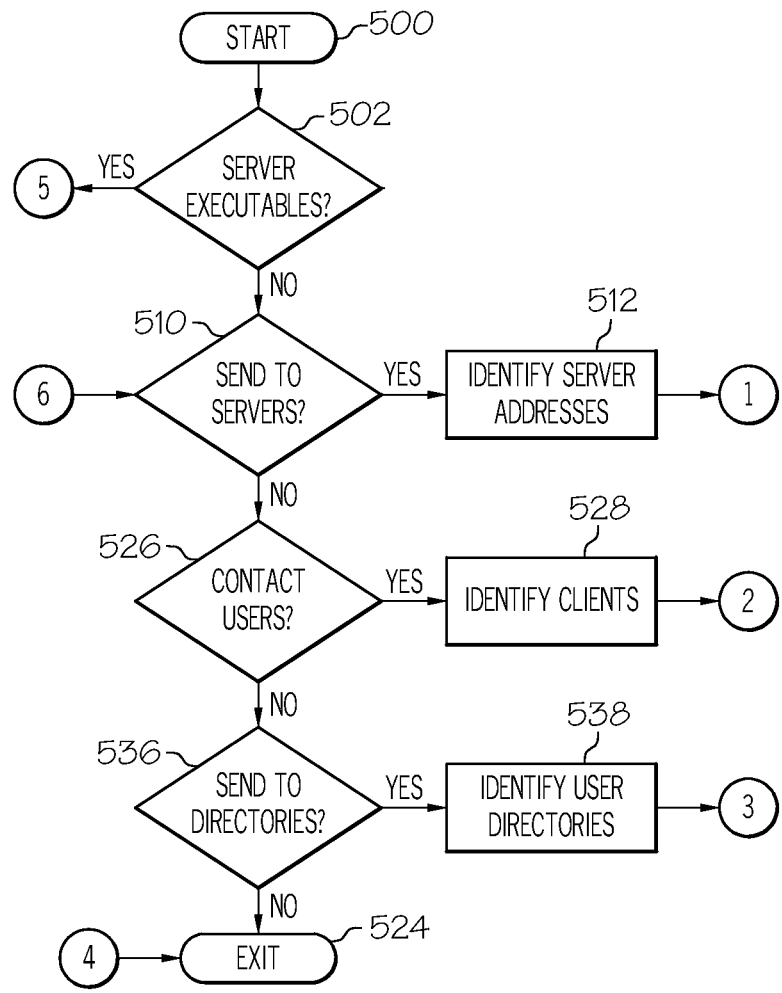
FIGS. 5a-b are flow-chart showing steps taken to deploy software capable of executing the steps described in FIGS. 1-2i.
Figure 5B:
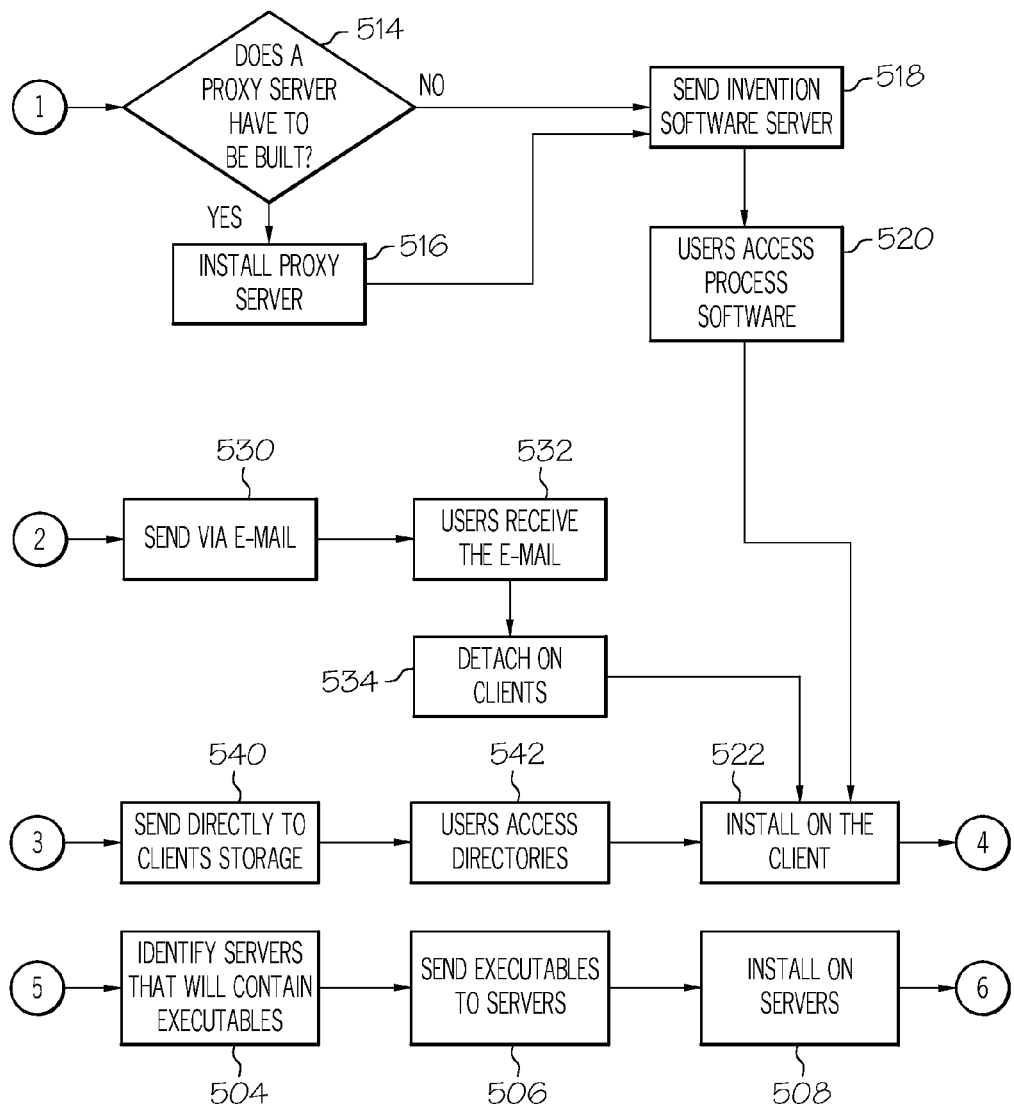

Referring then to FIGS. 5a-b, step 500 begins the deployment of the process software. The first thing is to determine if there are any programs that will reside on a server or servers when the process software is executed (query block 502). If this is the case, then the servers that will contain the executables are identified (block 504). The process software for the server or servers is transferred directly to the servers' storage via File Transfer Protocol (FTP) or some other protocol or by copying though the use of a shared file system (block 506). The process software is then installed on the servers (block 508).

Next, a determination is made on whether the process software is to be deployed by having users access the process software on a server or servers (query block 510). If the users are to access the process software on servers, then the server addresses that will store the process software are identified (block 512).

A determination is made if a proxy server is to be built (query block 514) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 516). The process software is sent to the servers either via a protocol such as FTP or it is copied directly from the source files to the server files via file sharing (block 518). Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems (block 520). Another embodiment is to have the servers automatically copy the process software to each client and then run the installation program for the process software at each client computer. The user executes the program that installs the process software on his client computer (block 522) then exits the process (terminator block 524).

In query step 526, a determination is made whether the process software is to be deployed by sending the process software to users via e-mail. The set of users where the process software will be deployed are identified together with the addresses of the user client computers (block 528). The process software is sent via e-mail to each of the users' client computers (block 530). The users then receive the e-mail (block 532) and then detach the process software from the e-mail to a directory on their client computers (block 534). The user executes the program that installs the process software on his client computer (block 522) then exits the process (terminator block 524).

Lastly a determination is made as to whether the process software will be sent directly to user directories on their client computers (query block 536). If so, the user directories are identified (block 538). The process software is transferred directly to the user's client computer directory (block 540). This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software (block 542). The user executes the program that installs the process software on his client computer (block 522) and then exits the process (terminator block 524).

VPN Deployment

The present software can be deployed to third parties as part of a service wherein a third party VPN service is offered as a secure deployment vehicle or wherein a VPN is build on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over a network. The protocol of the outer packet is understood by the network and both points, called runnel interfaces, where the packet enters and exits the network.

Software Integration

The process software which consists code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists match the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory utilization, storage utilization, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory utilization, storage utilization, etc. approach a capacity so as to affect performance, additional network bandwidth, memory utilization, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 6A:
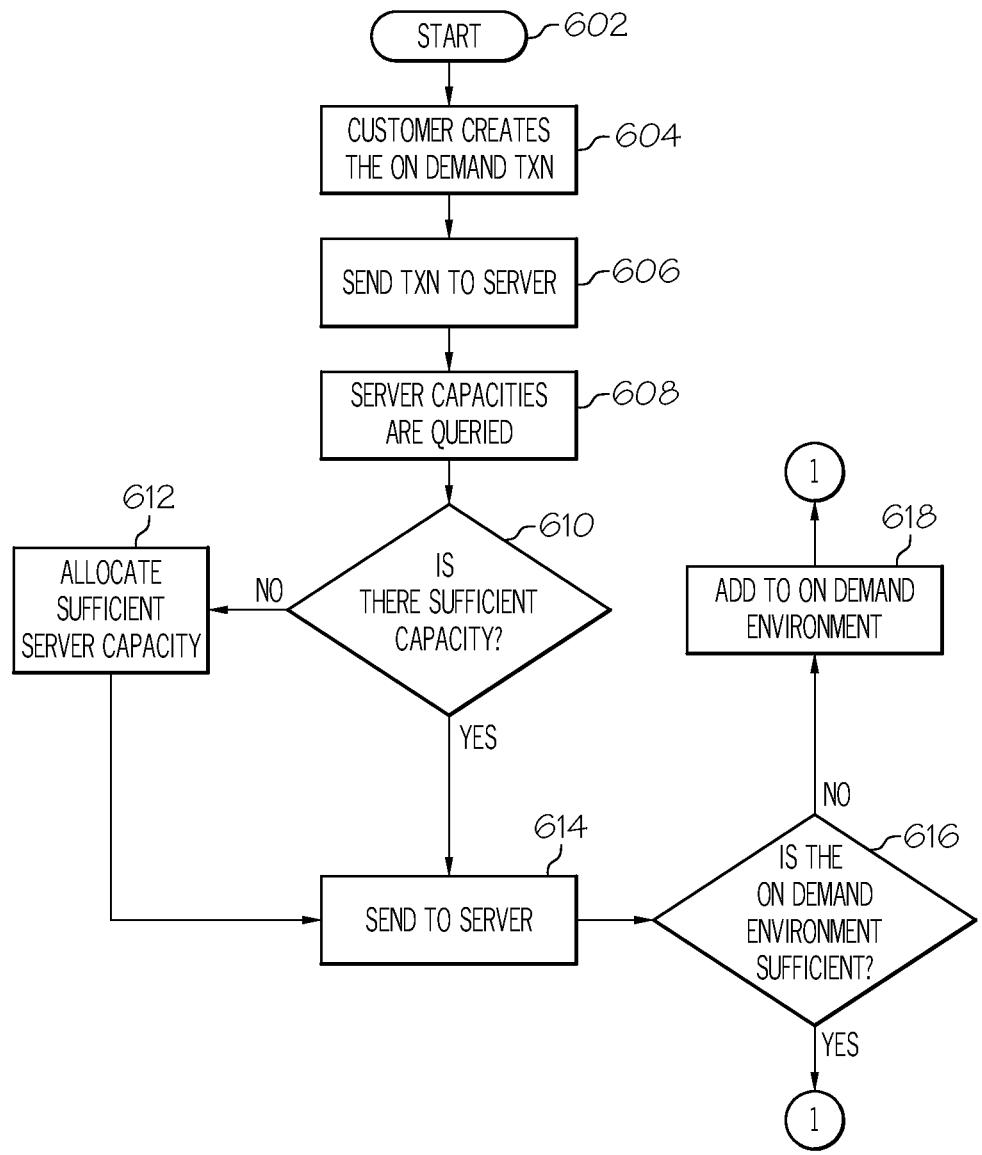
FIGS. 6a-b are flow-charts showing steps taken to execute the steps shown in FIGS. 1-2i using an on-demand service provider.
Figure 6B:
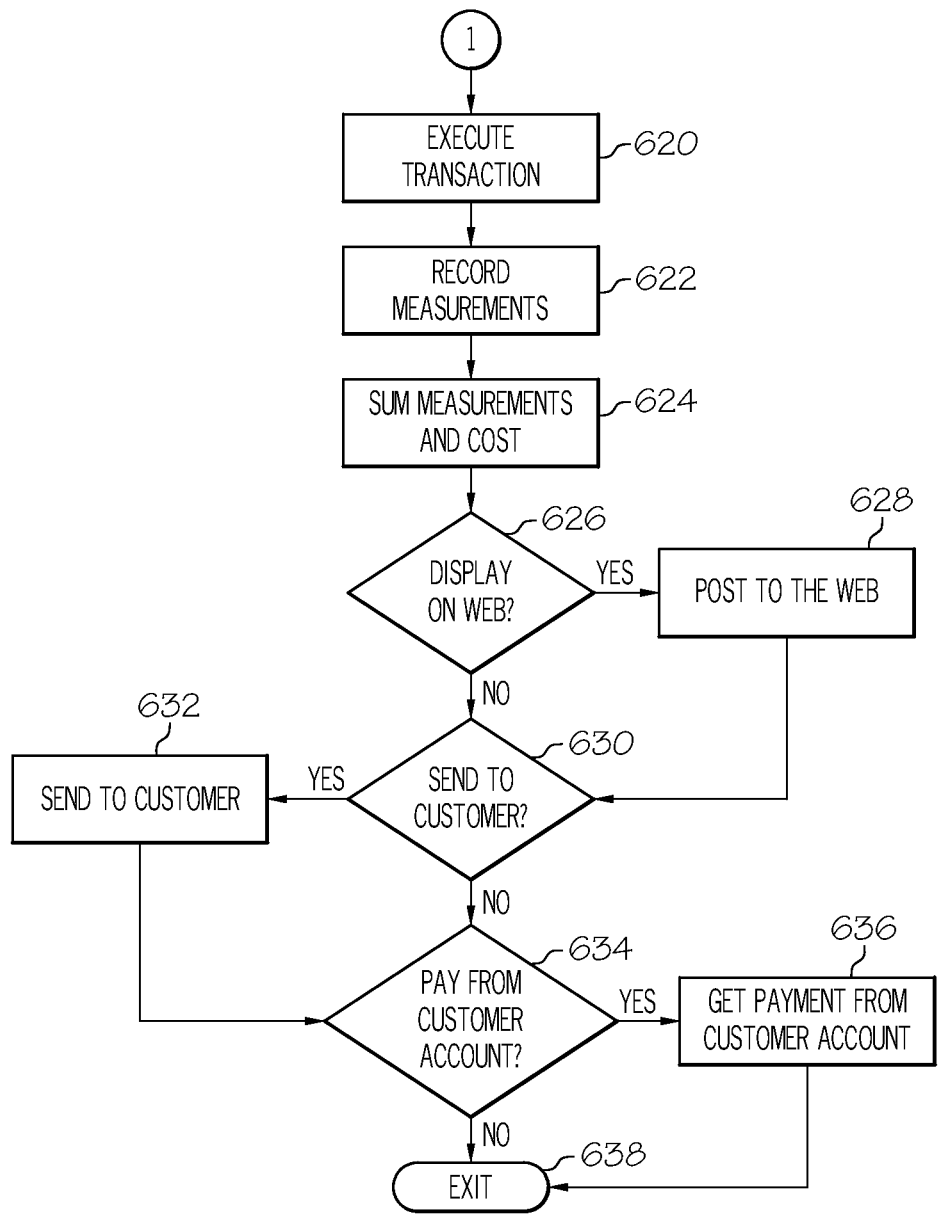

With reference now to FIGS. 6a-b, initiator block 602 begins the On Demand process. A transaction is created than contains the unique customer identification, the requested service type and any service parameters that further, specify the type of service (block 604). The transaction is then sent to the main server (block 606). In an On Demand environment the main server can initially be the only server, then as capacity is consumed other servers are added to the On Demand environment.

The server central processing unit (CPU) capacities in the On Demand environment are queried (block 608). The CPU requirement of the transaction is estimated, then the servers available CPU capacity in the On Demand environment are compared to the transaction CPU requirement to see if there is sufficient CPU available capacity in any server to process the transaction (query block 610). If there is not sufficient server CPU available capacity, then additional server CPU capacity is allocated to process the transaction (block 612). If there was already sufficient Available CPU capacity then the transaction is sent to a selected server (block 614).

Before executing the transaction, a check is made of the remaining On Demand environment to determine if the environment has sufficient available capacity for processing the transaction. This environment capacity consists of such things as but not limited to network bandwidth, processor memory, storage etc. (block 616). If there is not sufficient available capacity, then capacity will be added to the On Demand environment (block 618). Next the required software to process the transaction is accessed, loaded into memory, then the transaction is executed (block 620).

The usage measurements are recorded (block 622). The utilization measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 624).

If the customer has requested that the On Demand costs be posted to a web site (query block 626), then they are posted (block 628). If the customer has requested that the On Demand costs be sent via e-mail to a customer address (query block 630), then these costs are sent to the customer (block 632). If the customer has requested that the On Demand costs be paid directly from a customer account (query block 634), then payment is received directly from the customer account (block 636). The On Demand process is then exited at terminator block 638.

Method Invoking Rules

The methods described herein may be invoked by one or more rules. These rules may be specific for a resource, a network, an enterprise, or any other resource partition at any granularity. The rule can optionally be initiated by a policy. Resources are defined to include hardware resources as well as software resources.

Figure 7A:
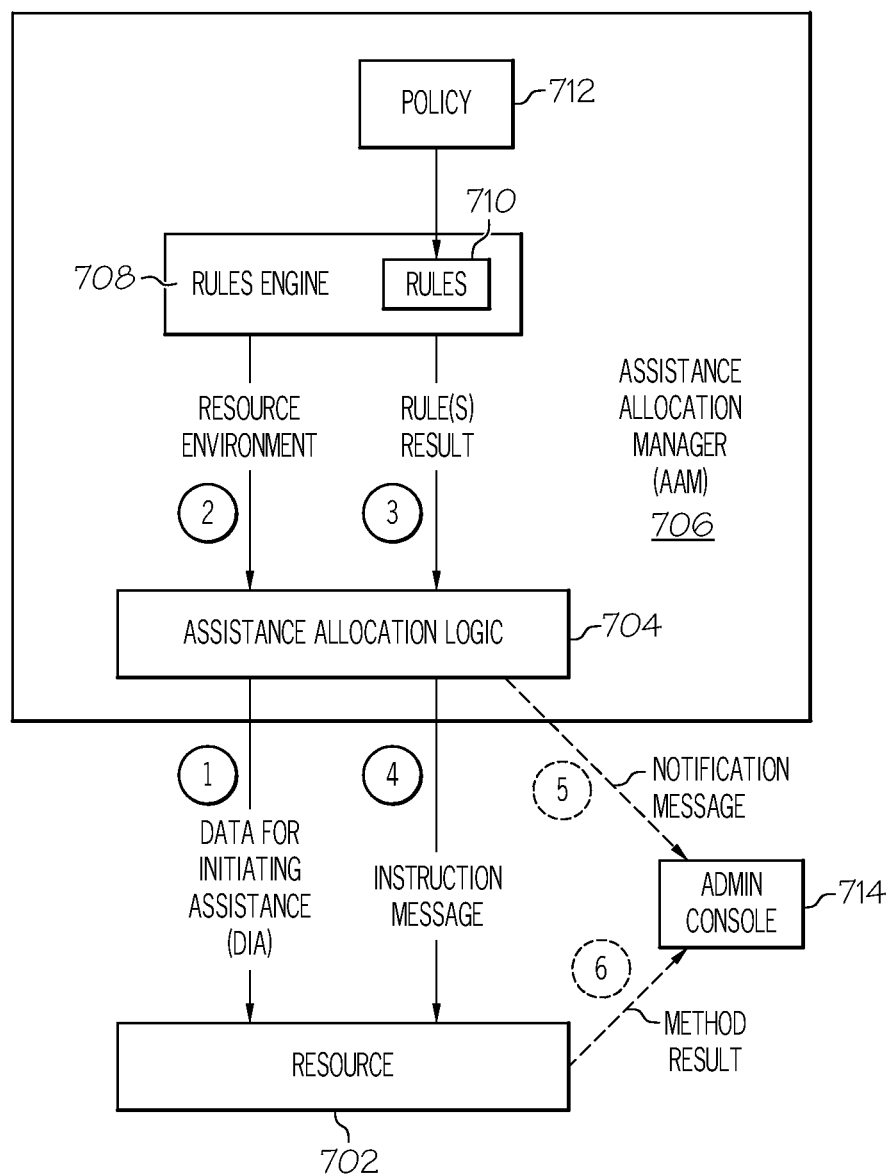
FIGS. 7a-b illustrate a process for utilizing one or more rules to invoke the methods described by the present invention.

For example, consider the infrastructure and process shown in FIG. 7a. As shown in Step 1 (depicted as a circle around the numeral "1"), a resource 702 sends Data for Initiating Assistance (DIA) to an Assistance Allocation Logic (AAL) 704 in an Assistance Allocation Manager (AAM) 706. The DIA may be a request for another resource, such as a particular Webpage, a portal resource (including portlets, etc.), a control instruction, etc. The DIA may also be performance data that is pushed or pulled from the resource 702. That is, resource 702 may issue a DIA requesting delivery of web content, execution of a server-based application, access to a particular website or a particular software resource, including an application, a method/class, a portlet, etc. In addition (or alternatively), the DIA may be performance data, such as data that describes Central Processor Unit (CPU) usage, clock speed, hardware temperature, the number of users (actual or allocated) of the resource, etc. Such examples of types of DIA are exemplary only, and are not to limit the scope of the definition of a DIA.

When AAL 704 receives a DIA, AAL 704 retrieves environment information, which includes state information available to the AAL (e.g., time of day) and data included in the DIA. The resource environment information includes, but is not limited to, the type of DIA (request for a resource, performance data, etc.), an identifier for the resource that sent the DIA, current state conditions of other resources managed by AAM 706, current policies being implemented by an enterprise, etc. The DIA type may be determined by a request type indicator that is part of the DIA (indicating that the DIA is for a request for resource(s), performance data, etc.), or the DIA may be linked to metadata that supplies, identifies, and describes the DIA type.

The DIA, together with any other environmental context (e.g., time of day, the current load on AAM 706, etc.), combine to form resource environment information, which is made accessible to a rules engine 708, as shown at Step 2. Rules engine 708 includes a library of rules 710, which may be expressed as compiled code (e.g., Java™ bytecodes) that ultimately causes resource 702 to execute the steps of the inventive method described above. Other well-known forms of rule expression are also possible. (For example, the Extensible Access Control Markup Language (XACML) standard ratified by the Organization for the Advancement of Structured Information Standards (OASIS) standards body, defines an exemplary form for such a rule expression.) Note that the creation of the rules 710 may be initiated by and responsive to a policy 712. Policy 712 is a (preferably enterprise-wide) policy that describes, in non-technical language, how one or more resources are to be utilized. Policy 712 may be formulated by a person or software logic associated with AAM 706, resource 702, or any other entity (including the enterprise that utilizes resource 702), which has the authority to influence the formulation of the rules 710.

Rules engine 708 evaluates one or more rules 710 in the current environmental context described above. After evaluating the appropriate rule(s) 710 for the current environmental context, rules engine 708 generates a rule(s) result, which is sent from rules engine 708 to AAL 704 (as shown in Step 3). The rule(s) result of Step 3 provides adequate cues for AAL 704 to generate an instruction message for resource 702 (Step 4). This instruction message for resource 702 may be a method call, source code, compiled code, binaries, applets, etc., which are executable by resource 702 to implement the steps of the inventive method described above, or the instruction message may simply set a flag, bit, or other data in resource 702 that will result in resource 702 taking the appropriate steps necessary to implement the inventive method (e.g., calling another resource, initiating a local action, etc.). Note that, as shown in Step 5, an admin console 714 may optionally be notified, concurrently or non-concurrently with Step 4, that resource 702 has received the instruction message. This notification message may include details that include, but are not limited to, DIA information, resource environment information, rule(s) results, as well as results of the inventive method being implemented in resource 702 (Step 6).

Figure 7B:
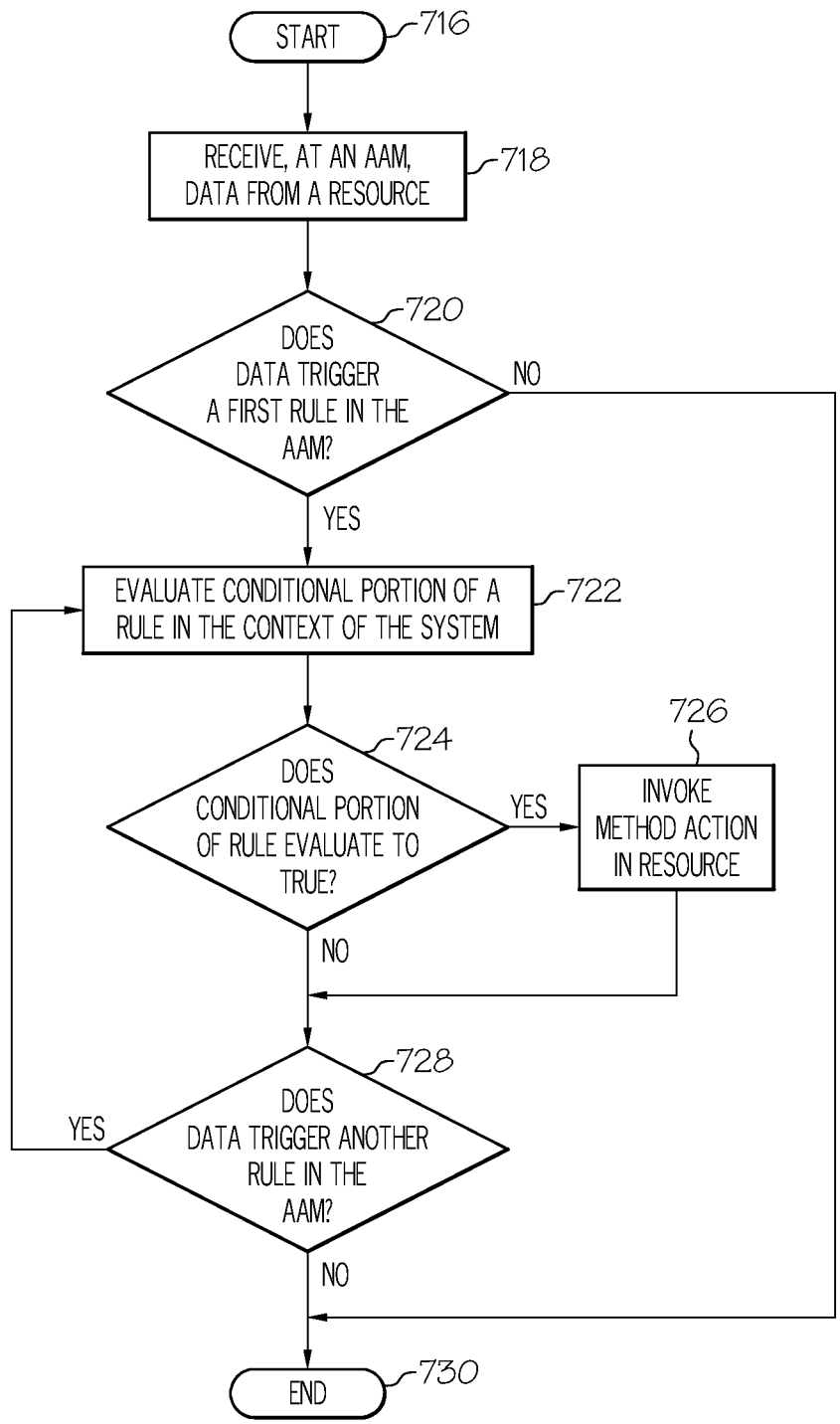

With reference now to FIG. 7b, a flow-chart of exemplary steps taken to invoke a method by a rule is presented. After initiator block 716, an Assistance Allocation Manager (AAM) receives data (e.g., Data for Initiating Assistance—

DIA) from a resource (block 718). The AAM may be a web-based service, such as that offered by IBM® Global Services® (IGS™), using a Service Oriented Architecture (SOA) software service such as IBM's Websphere®. The SOA software includes a bottom level of applications (pieces of code that perform some useful function), a middle level of Web services (infrastructure for accessing the applications), and a top layer of business processes (steps taken to call the Web services). Thus, in a preferred embodiment, the AAM is a third party service that manages resources for a customer.

Continuing with FIG. 7b, an evaluation of the DIA is made to determine if the DIA triggers (invokes) a first rule in the AAM (block 720). If so, then a conditional portion of the first rule is evaluated in the context of the system (block 722). As discussed above, the context of the system may include real-time status conditions for the resource (e.g., time, date, current operating condition, number of current users, CPU usage, memory load, etc.). As described in query block 724, if the conditional portion of the called rule evaluates to "TRUE," (i.e., the DIA invokes the rule), then the present invention's method steps are invoked for, and executed in, the resource (block 726). Preferably, rules stored in the AAM are associated with flags that indicate whether one or more rules may be called by a single DIA. Thus, if a flag in the AAM is set to permit multiple rules to be invoked by a single DIA, then an evaluation is made to determine if another rule is invoked by the receipt of the DIA (query block 728). If so, then such other rules are evaluated in an iterative manner as just described until there are no more applicable rules to be invoked (termination block 730).

As described herein, the present invention can be used to analyze data and document findings from a variety of contact studies. Contact study designs can be characterized as cross-sectional, longitudinal, or mixed.

Cross-sectional designs compare measures across groups without regard to the time periods covered by the data, which are typically either short, so that timing isn't a factor, or are controlled by other means, such as establishing peer groups according to process maturity. Such designs are commonly used for one-time studies during benchmarking, due diligence, and transformation assessment.

Longitudinal designs compare measures over time. That is, comparisons are between successive instances of the same measures. Such designs are commonly used for repeated measures during management of on-going business processes and quality assurance of service innovations.

Mixed designs include both cross-sectional and longitudinal comparisons. Such designs are commonly used during technology assessments, process troubleshooting, process reengineering, and process maturity assessments.

The present invention performs (but is not limited to) the following functions:

Consolidates data from multiple instances of the Collector tool into a single database. During consolidation, duplicate records are eliminated, legacy data is upgraded to current standards, and invalid values are flagged for correction or elimination.

Incorporates all study customizations from the Collector tool, such as (a) unique questions devised for a particular study and (b) specific contact phases, information systems, and system functions measured. Customizations may reflect differences between contact source (e.g., inbound vs. outbound), type (e.g., phone, e-mail, paper mail, etc.), reason (e.g., order, payment, return, inquiry, repair, etc.), segment (e.g., employee vs. retiree, preferred vs. regular customer, etc.) and center (e.g., regional vs. national).

Generates statistics corresponding to the study design built in the Planner tool. For example, a typically study design consists of contact types by segments. Such a design is used to plan and manage data collection to ensure adequate sample sizes are attained for each dimension of the design.

Plots charts and generates tables based on cross-sectional, longitudinal, or mixed designs.

Exports charts and tables into external presentation and document files.

The present invention supports statistical analysis, visualization, and ease of use—three objectives that are often in conflict. For instance, there is no need for users to define variables, their units of measure, or their valid values because the tool already knows this information. Users can simply pick variables, statistics, and plots from lists generated automatically.

The present invention answers many contact study questions, such as these:

Is handle time normally distributed?

If not, what characterizes the outliers pulling the mean away from the median?

Which contact centers have significantly different average handle time (AHT)?

Are the majority clustered around the grand mean or are they spread across the full range?

Why do some contact centers have longer AHT? Is it due to differences in contact volume, contact types, segments served, etc.?

Which contact phases account for the largest share of AHT? Are there differences across contact types, centers, or reasons?

Do AHT patterns over hours of the day and days of the week and fit historical patterns?

If not, what factors account for the decline or improvement in performance?

What portion of all contacts are resolved on first contact? Among those requiring follow-up, what are the dominant reasons?

What are the most prevalent reasons for contact?

How are those reasons distributed between automated and live agent contacts?

Which contacts are handled by automated self-service before or after a live agent?

How do people being served by the contact rate their satisfaction with that service?

What is the satisfaction trend?

Which information systems are used for the longest time? Which ones are used most frequently—even if for just a short time?

Which functions within those information systems are used longest or most often?

Do hold time, repeated requests for the same information, or manual calculations indicate agent needs not adequately supported by information systems?

Do agent tenure or skill level correlate with AHT and/or satisfaction?

How much impact does first call resolution (FCR) have on satisfaction?

When contacts are transferred, where are the most prevalent sources and destinations?

Are sales opportunities being targeted at the correct customer segments?

Which contact types might be reduced or eliminated by business policy changes, such as promotions, product options, service activation, credit extension, return authorization, etc.

How do recent performance levels compare to relevant baseline and benchmark values?

Are the trends over time favorable?

An exemplary method taught by the present invention is as follows. A User (chief researcher or research assistant) acquires instances of the Collector tool from all persons monitoring contacts during a given study. The User consolidates those files into a single database via the Analyzer, then corrects or discards erroneous and incomplete cases. The User retrieves study design from Planner tool and verifies that the data conforms to it. The User evaluates database to ensure sample sizes are adequate for the study design. The User evaluates database to determine whether transformations are required to satisfy assumptions of statistical models, and performs those transformations if necessary. The User selects research questions from predefined list (such as the one provided above) and clicks one button to generate charts answering those questions. Alternatively, the user selects variables and cases as needed to answer research questions, then user manually generates charts and tables needed to answer research questions.

User and study sponsors (executives, managers, clients) use the Analyzer to answer original research questions as well as new ones that arise out of the analysis itself. For example, if during an analysis of one study is becomes apparent that long handle times and number of times that a caller was placed on hold were correlated, follow-on research questions may be "What were the callers' issue?," "What were the agents doing to address those issues?," "How were the information systems providing support?," and "Which business policies were constraining the solutions?"

For cross-sectional and mixed studies, user and sponsors: compare current findings to previous benchmarks, if any; diagnose root causes of weak performance by looking for constraints; explore the potential impact of transformations by looking for leverage points; and set improvement targets. Note that a constraint is defined as anything that limits throughput, such as understaffing, inadequate skills, slow response from a particular system, lack of some essential information, of inability to reconcile disparate information across systems. Note further that a leverage point generates a benefit that is significantly larger than its cost. For example, if less than 5% of calls cause over 25% of long handle time, then transforming that small subset of calls should have a large potential benefit.

For longitudinal and mixed studies, user and sponsors: establish a baseline from the initial data collection; compare current findings from subsequent data collections to the baseline; assess whether targeted improvements have occurred and decide whether different transformations or new targets are needed; and reset the baseline as appropriate (e.g., when major transformation milestones are achieved or the enterprise's mission/strategy/structure change).

The User exports statistics and charts into presentations and documents as necessary. When additional data becomes available, user repeats the above described steps.

The present invention thus provides for a method, system, and computer-readable medium for analyzing contact studies for a call service center. In one embodiment, the method includes the steps of: acquiring data instances of a Collector tool from all persons monitoring contacts at a call service center during a given study period; retrieving a study design from a Planner tool to verify that acquired data instances conform to the study design; selecting data parameters for the acquired data instances, wherein the data parameters describe multiple features of the acquired data; automatically selecting an appropriate chart format that is appropriate for measurement units used by the data parameters; and creating a chart using the appropriate chart format and the data parameters. The call service center may be part of a BTO service. The steps in the method may all be automatically performed by an Analyzer logic. The method may further include the steps of automatically generating one or more questions regarding operations of the call service center, wherein the one or more questions are automatically generated by the Analyzer by associating one or more pre-defined questions with selected data parameters; consolidating the data instances, from multiple independent storage devices, into a single database that is accessible to the Analyzer logic; automatically sorting, via the Analyzer, the depicted data instances in the chart, wherein data instances are depicted in a decreasing order from left to right; and exporting a sorted chart and the one or more questions into a written report. In one embodiment, the method further includes the steps of receiving, by an Assistance Allocation Manager (AAM), a Data for Initiating Assistance (DIA) from a resource in a data processing system; and in response to receiving the DIA, executing a rule, in the AAM, that is specific for the DIA and the resource that sent the DIA, wherein executing the rule in the AAM causes the steps described herein to be executed for the resource that sent the DIA.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A method for analyzing contact studies for a call service center, the method comprising:
   acquiring data instances of a Collector tool from all persons and software driven monitors monitoring contacts at a call service center during a given study period into a database, wherein the contacts include telephone calls that each have multiple phases, and wherein each of the multiple phases has a respective phase code and the multiple phases include a classify phase, a diagnosis phase, and a resolution phase;
   identifying a phase out of the multiple phases of a telephone call by identifying keywords associated with an identified phase in the telephone call to determine a contact type of the telephone call;
   correcting any erroneous and incomplete data instances of the acquired data instances, including discarding data instances which are not needed for any application;
   retrieving a study design from a Planner tool to verify that the acquired data instances conform to the study design;

evaluating the database to ensure sample sizes of the acquired data instances are adequate for the study design;
performing transformations on the acquired data instances to satisfy assumptions of statistical models to determine whether notification for a collection of new data instances needs to be sent to the Collector tool;
selecting data parameters for the acquired data instances, wherein the data parameters describe multiple features of the acquired data instances, wherein the data parameters include the multiple phases, a parameter representing when an issue was resolved, and a parameter representing customer satisfaction;
automatically selecting an appropriate chart format that is appropriate for measurement units used by the data parameters; and
creating a chart using the appropriate chart format and the data parameters, wherein the chart includes a respective time spent in each of the multiple phases.

2. The method of claim 1, wherein all steps in claim 1 are automatically performed by an Analyzer logic.

3. The method of claim 2, further comprising:
automatically generating one or more questions regarding operations of the call service center, wherein the one or more questions are automatically generated by the Analyzer logic by associating one or more pre-defined questions with selected data parameters.

4. The method of claim 3, further comprising:
consolidating the data instances, from multiple independent storage devices, into a single database that is accessible to the Analyzer logic.

5. The method of claim 4, further comprising:
automatically sorting, via the Analyzer logic, the depicted data instances in the chart, wherein data instances are spatially depicted in a decreasing order.

6. The method of claim 5, wherein the call service center is part of a Business Transformation Outsourcing (BTO) service.

7. The method of claim 1, further comprising:
receiving, by an Assistance Allocation Manager (AAM), a Data for Initiating Assistance (DIA) from a resource in a data processing system; and
in response to receiving the DIA, executing a rule, in the AAM, that is specific for the DIA and the resource that sent the DIA, wherein executing the rule in the AAM causes the steps described in claim 1 to be executed for the resource that sent the DIA.

8. A system for analyzing contact studies for a call service center, the system comprising:
a processor;
a data bus coupled to the processor;
a memory coupled to the data bus; and
a computer-usable medium embodying computer program code, wherein the computer readable storage medium is not a transitory signal per se, the computer program code comprising instructions executable by the processor and configured for executing steps that comprise:
acquiring data instances of a Collector tool from all persons and software driven monitors monitoring contacts at a call service center during a given study period into a database, wherein the contacts include telephone calls that each have multiple phases, and wherein each of the multiple phases has a respective phase code and the multiple phases include a classify phase, a diagnosis phase, and a resolution phase;
identifying a phase out of the multiple phases of a telephone call by identifying keywords associated with an identified phase in the telephone call to determine a contact type of the telephone call;
correcting any erroneous and incomplete data instances of the acquired data instances, including discarding data instances which are not needed for any application;
retrieving a study design from a Planner tool to verify that the acquired data instances conform to the study design;
evaluating the database to ensure sample sizes of the acquired data instances are adequate for the study design;
performing transformations on the acquired data instances to satisfy assumptions of statistical models to determine whether notification for a collection of new data instances needs to be sent to the Collector tool;
selecting data parameters for the acquired data instances, wherein the data parameters describe multiple features of the acquired data instances, wherein the data parameters include the multiple phases, a parameter representing when an issue was resolved, and a parameter representing customer satisfaction;
automatically selecting an appropriate chart format that is appropriate for measurement units used by the data parameters; and
creating a chart using the appropriate chart format and the data parameters, wherein the chart includes a respective time spent in each of the multiple phases.

9. The system of claim 8, wherein all steps are automatically performed by an Analyzer logic.

10. The system of claim 9, wherein the instructions are further configured for:
automatically generating one or more questions regarding operations of the call service center, wherein the one or more questions are automatically generated by the Analyzer logic by associating one or more pre-defined questions with selected data parameters.

11. The system of claim 10, wherein the instructions are further configured for:
consolidating the data instances, from multiple independent storage devices, into a single database that is accessible to the Analyzer logic.

12. The system of claim 11, wherein the instructions are further configured for:
automatically sorting, via the Analyzer logic, the depicted data instances in the chart, wherein data instances are spatially depicted in a decreasing order.

13. The system of claim 12, wherein the instructions are further configured for:
exporting a sorted chart and the one or more questions into a written report.

14. The system of claim 8, wherein the instructions are further configured for:
receiving, by an Assistance Allocation Manager (AAM), a Data for Initiating Assistance (DIA) from a resource in a data processing system; and
in response to receiving the DIA, executing a rule, in the AAM, that is specific for the DIA and the resource that sent the DIA, wherein executing the rule in the AAM causes the steps described in claim 1 to be executed for the resource that sent the DIA.

15. A storage device embodying computer program code for analyzing contact studies for a call service center, the computer program code embodied on a computer-usable medium which is not a transitory signal per se, and comprising computer executable instructions that, when executed by a data processing system, are configured for:

acquiring data instances of a Collector tool from all persons and software driven monitors monitoring contacts at a call service center during a given study period into a database, wherein the contacts include telephone calls that each have multiple phases, and wherein each of the multiple phases has a respective phase code and the multiple phases include a classify phase, a diagnosis phase, and a resolution phase;

identifying a phase out of the multiple phases of a telephone call by identifying keywords associated with an identified phase in the telephone call to determine a contact type of the telephone call;

correcting any erroneous and incomplete data instances, including discarding data instances which are not needed for any application;

retrieving a study design from a Planner tool to verify that the acquired data instances conform to the study design;

evaluating the database to ensure sample sizes of the acquired data instances are adequate for the study design;

performing transformations on the acquired data instances to satisfy assumptions of statistical models to determine whether notification for a collection of new data instances needs to be sent to the Collector tool;

selecting data parameters for the acquired data instances, wherein the data parameters describe multiple features of the acquired data instances, wherein the data parameters include the multiple phases, a parameter representing when an issue was resolved, and a parameter representing customer satisfaction;

automatically selecting an appropriate chart format that is appropriate for measurement units used by the data parameters; and creating a chart using the appropriate chart format and the data parameters, wherein the chart includes a respective time spent in each of the multiple phases.

16. The storage device of claim 15, wherein all steps are automatically performed by an Analyzer logic.

17. The storage device of claim 16, wherein the instructions are further configured for:

automatically generating one or more questions regarding operations of the call service center, wherein the one or more questions are automatically generated by the Analyzer logic by associating one or more pre-defined questions with selected data parameters.

18. The storage device of claim 17, wherein the instructions are further configured for:

consolidating the data instances, from multiple independent storage devices, into a single database that is accessible to the Analyzer logic.

19. The storage device of claim 15, wherein the computer executable instructions are deployable to a client computer from a download server that is at a remote location.

20. The storage device of claim 15, wherein the computer executable instructions are provided by a download service provider to a client computer on an on-demand basis.

* * * * *